(12) United States Patent
Niida et al.

(10) Patent No.: US 6,690,648 B2
(45) Date of Patent: *Feb. 10, 2004

(54) DATA COMMUNICATION APPARATUS, METHOD, AND SYSTEM UTILIZING RECEPTION CAPABILITY INFORMATION OF A DESTINATION NODE

(75) Inventors: Mitsuo Niida, Yokohama (JP); Takashi Kobayashi, Yokohama (JP); Shinichi Hatae, Kawasaki (JP); Shinji Ohnishi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,924

(22) Filed: Feb. 19, 1999

(65) Prior Publication Data

US 2003/0156093 A1 Aug. 21, 2003

(30) Foreign Application Priority Data

| Feb. 24, 1998 | (JP) | ............................................. 10-042656 |
| Apr. 9, 1998 | (JP) | ............................................. 10-097917 |
| Apr. 22, 1998 | (JP) | ............................................. 10-112355 |

(51) Int. Cl.$^7$ ................................................. G01R 31/08
(52) U.S. Cl. ....................................... 370/236; 370/248
(58) Field of Search ................................. 370/276, 236, 370/282, 351, 359, 338, 400–402, 419, 438, 445, 458, 463, 469, 489, 498, 252, 230, 229, 248–9, 250–2

(56) References Cited

U.S. PATENT DOCUMENTS

| 5,938,752 A | * | 8/1999 | Leung et al. ................ 710/106 |
| 6,237,106 B1 | | 5/2001 | Koyama et al. ............. 713/502 |
| 6,272,114 B1 | | 8/2001 | Kobayashi ................... 370/257 |
| 6,405,247 B1 | * | 6/2002 | Lawande et al. ........... 709/221 |

FOREIGN PATENT DOCUMENTS

| EP | 0 804 008 A2 | 10/1997 |
| EP | 0 841 791 A1 | 5/1998 |
| WO | WO 97/38513 | 10/1997 |

OTHER PUBLICATIONS

Stevens, TCP/IP Illustrated, vol. 1, 1994, pp. 297–306.*

* cited by examiner

Primary Examiner—David Vincent
(74) Attorney, Agent, or Firm—Fitzpatrick, Cella, Harper & Scinto

(57) ABSTRACT

There is disclosed a communication system and communication protocol in which a source node and one or more destination nodes are logically connected, and a connection ID for identifying the logical connection relationship is used to control data communication between the nodes. There is also disclosed an efficient communication system and communication protocol in which an optimum time interval between a time to transmit an i-th (i being an optional integer) data and a time to transmit an (i+1)-th data can be set. There is further disclosed a communication system and communication protocol in which when the i-th data is not normally received, retry is inhibited only for a predetermined time to prevent the retry from unnecessarily occurring between a destination node slow in receiving process and a source node fast in transmitting process.

16 Claims, 16 Drawing Sheets

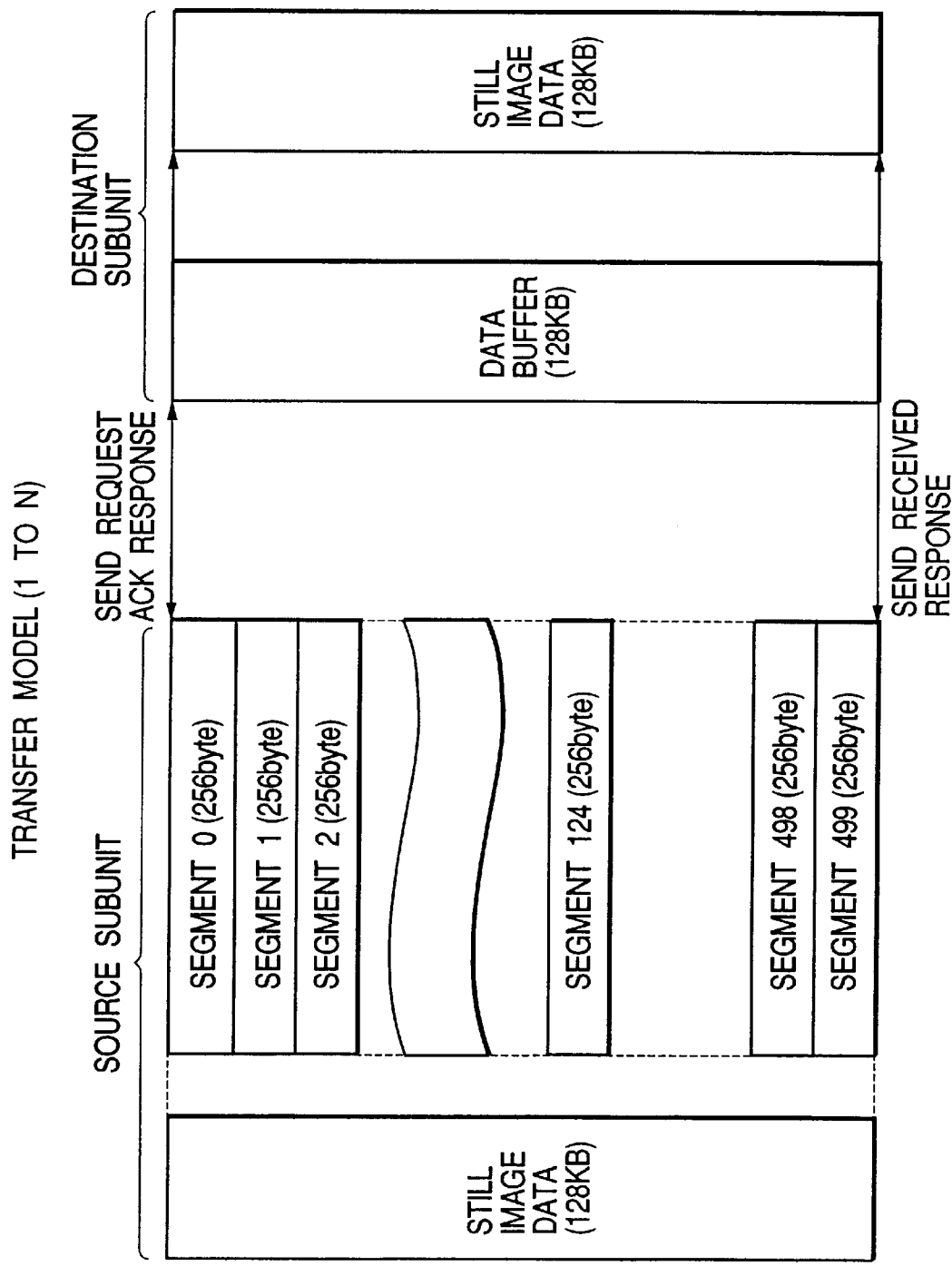

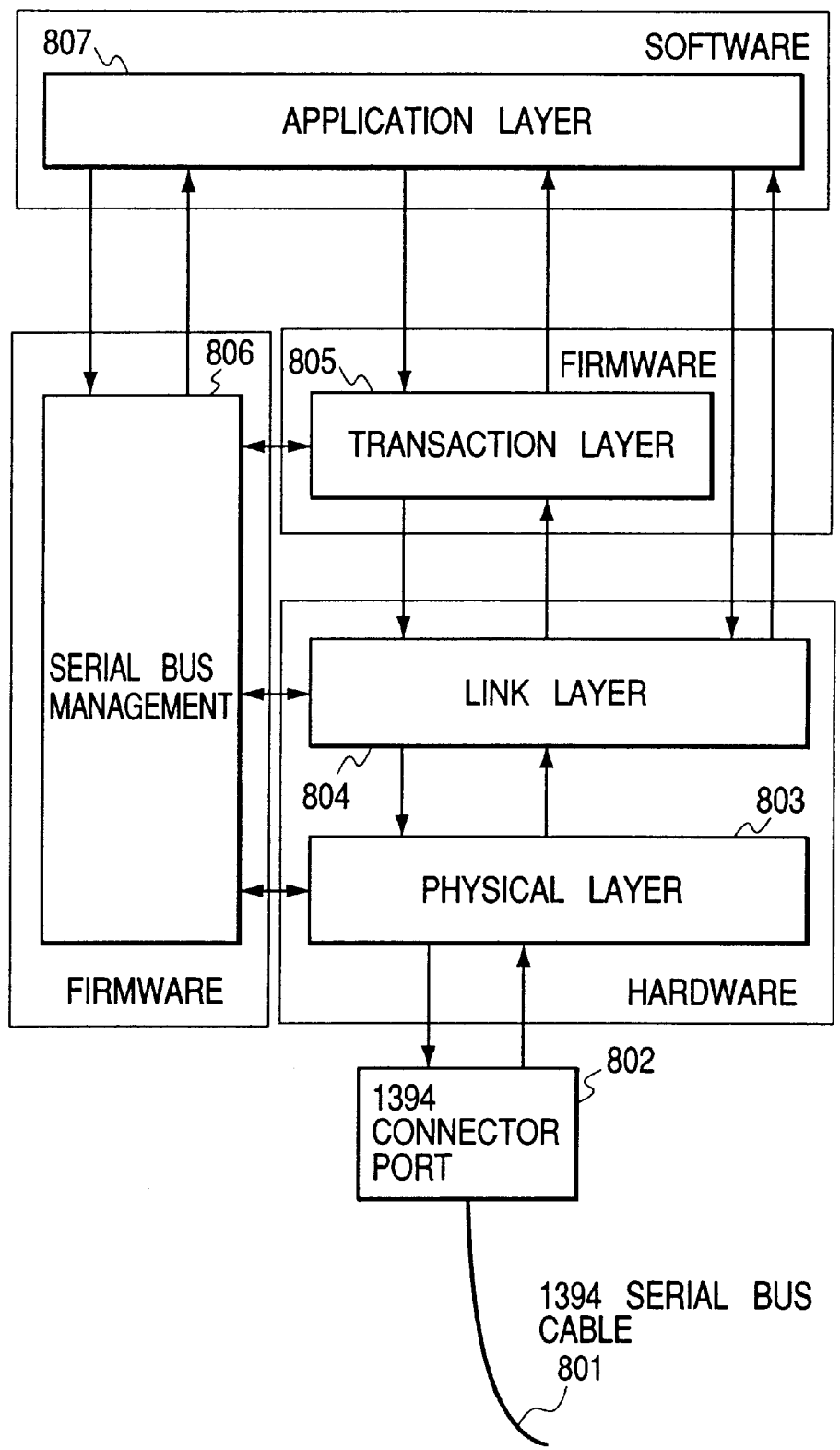

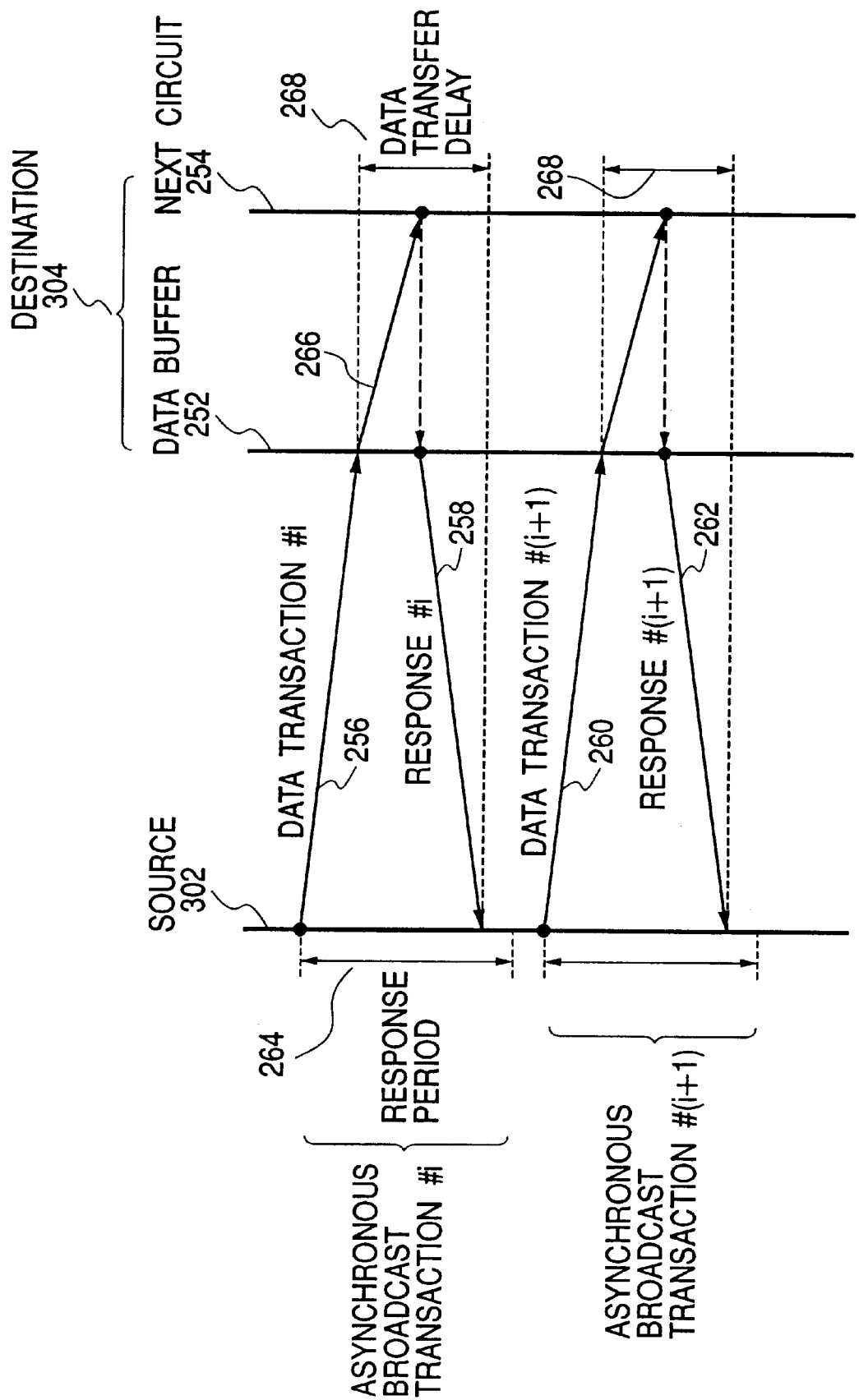

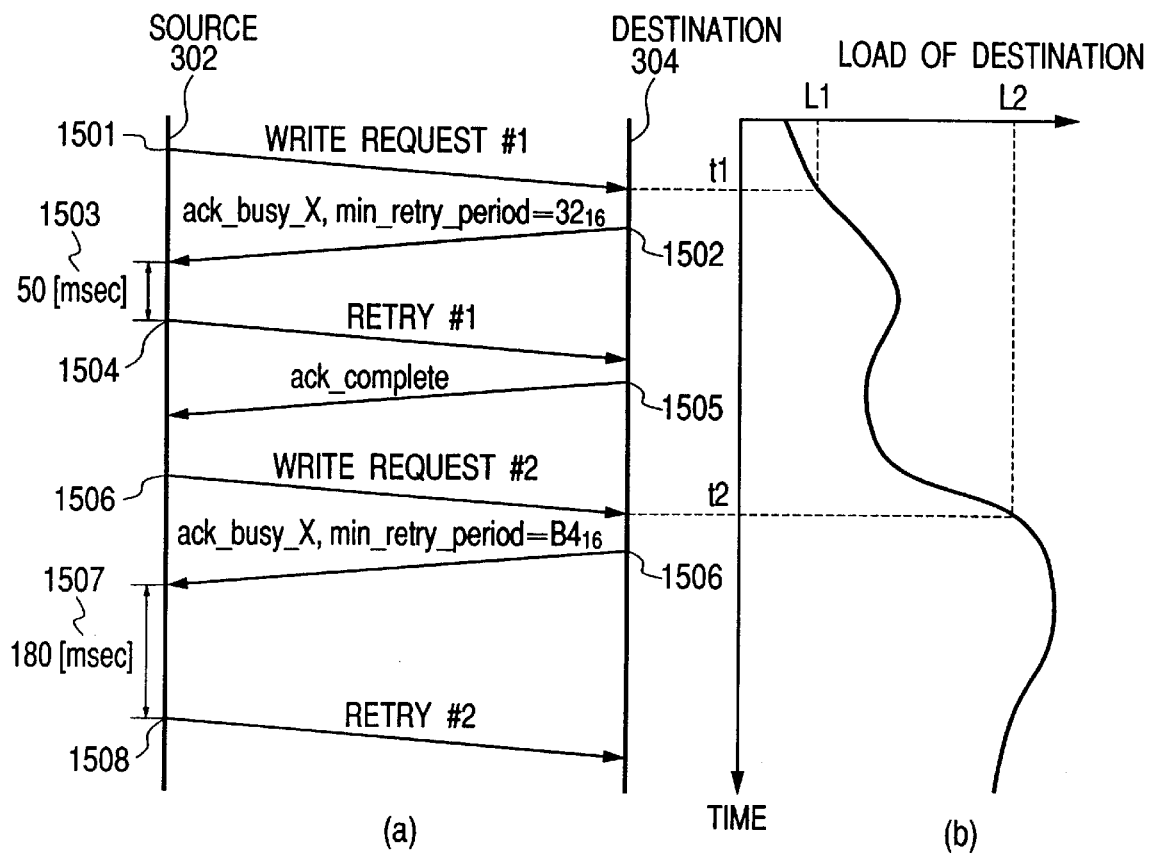

FIG. 17

| VALUE | NAME | MEANING |
|---|---|---|
| $0_{16}$ | Reserved | |
| $1_{16}$ | ack_complete | IT IS INDICATED THAT TO RECEIVE PACKET BY NODE WAS SUCCESSFUL. TRANSMISSION NODE INDICATES THAT TRANSACTION COMPLETED WHEN THE RECEIVED PACKET WAS REQUEST PACKET |
| $2_{16}$ | ack_pending | IT IS INDICATED THAT TO RECEIVE PACKET BY NODE WAS SUCCESSFUL. IT IS INDICATED THAT RECEIVING NODE MUST SEND RESPONSE PACKET WHEN THE RECEIVED PACKET WAS REQUEST PACKET |
| $3_{16}$ | Reserved | |
| $4_{16}$ | ack_busy_X | IT IS INDICATED THAT PACKET WAS NOT RECEIVED. IT IS INDICATED THAT RECEIVING NODE RECEIVES PACKET IF THE RECEIVING NODE WAS NOT busy WHEN RETRY |
| $5_{16}$ | ack_busy_A | IT IS INDICATED THAT PACKET COULD NOT BE RECEIVED. IT IS INDICATED THAT RECEIVING NODE RECEIVES PACKET IF THE RECEIVING NODE IS NOT busy WHEN RETRY PHASE A GENERATES NEXT TIME |
| $6_{16}$ | ack_busy_B | IT IS INDICATED THAT PACKET COULD NOT BE RECEIVED. IT IS INDICATED THAT RECEIVING NODE RECEIVES PACKET IF THE RECEIVING NODE IS NOT busy WHEN RETRY PHASE B GENERATES NEXT TIME |
| $7_{16}-C_{16}$ | Reserved | |
| $D_{16}$ | ack_data_error | IT IS INDICATED THAT CRC CHECK OF DATA BLOCK FAILED OR LENGTH OF DATA BLOCK PAYLOAD WAS NOT CONSISTENT WITH data_length FIELD |
| $E_{16}$ | ack_type_error | IT IS INDICATED THAT UNRIGHT VALUE IS INCLUDED IN FIELD OF HEADER OF REQUEST PACKET OR UNPROPER TRANSACTION WAS TRIED |
| $F_{16}$ | Reserved | |

DATA COMMUNICATION APPARATUS, METHOD, AND SYSTEM UTILIZING RECEPTION CAPABILITY INFORMATION OF A DESTINATION NODE

BACKGROUND OF THE INVENTION

1. Field of the Invention

The present invention relates to a data communication system, data communication method, data communication apparatus and digital interface, particularly to a network in which information data (including image data) and command data are mixed to perform communication at high speed and a communication protocol applicable to the network.

2. Related Background Art

Hard discs and printers have heretofore had highest frequencies of use among peripheral apparatuses of personal computers (hereinafter referred to as PC). These peripheral apparatuses are connected to PC via dedicated input/output interfaces, SCSI (small computer system interfaces) or other general-purpose digital interfaces.

On the other hand, in recent years, digital cameras, digital video cameras and other AV (Audio/Visual) apparatuses have gained public attention as PC peripheral apparatuses. The AV apparatuses are also connected to PC via dedicated interfaces.

FIG. 1 is a view showing a conventional communication system constituted of PC and AV apparatus.

In FIG. 1, numeral 101 denotes an AV apparatus or digital camera, 102 denotes PC, and 103 denotes a printer.

The digital camera 101 comprises a memory 104 in which a photographed image is compressed and recorded; a decoding unit 105 for expanding and decoding the compressed image data recorded in the memory 104; an image processing unit 106; a D/A converter 107; a display 108 comprising EVF; and a dedicated digital I/O unit 109 for connecting the digital camera 101 and the PC 102.

The PC 102 comprises a dedicated digital I/O unit 110 for connecting the PC 102 and the digital camera 101; an operation unit 111 comprising a keyboard, a mouse and the like; a decoding unit 112 for expanding and decoding the compressed image data; a display 113; a hard disc 114; RAM or another memory 115; an MPU 116; a PCI bus 117; and an SCSI interface 118 for connecting the PC 102 and the printer 103.

The printer 103 comprises an SCSI interface 119 for connecting the printer 103 and PC 102; a memory 120; a printer head 121; a printer controller 122 for controlling operation of the printer 103; and a driver 123.

In the conventional communication system, since the digital interface or digital I/O unit 109 of the digital camera 101 is not compatible with the digital interface or SCSI interface 110 of the printer 103, they cannot be directly interconnected. For example, a still image needs to be transmitted to the printer 103 from the digital camera 101 necessarily via the PC.

Moreover, in the conventional dedicated interface or the SCSI interface, when a large volume of data such as still images or moving images held by the AV apparatus are handled, many problems are caused that a data transfer rate is low, communication cable for parallel communication is thick, there are only a small number of types of connectable peripheral apparatuses, connection system is limited and that real-time data transfer cannot be performed.

Known as one of next-generation high-speed high-performance digital interfaces to solve the problems is an IEEE (The Institute of Electrical and Electronics Engineers, Inc.) 1394-1995 standards.

A digital interface conforming to the IEEE 1394-1995 standards (hereinafter referred to as the 1394 interface) has the following characteristics:

(1) data transfer rate is high;
(2) real-time data transfer system (i.e., Isochronous transfer system) and Asynchronous transfer system are supported;
(3) connection structure (topology) with a high degree of freedom can be constructed; and
(4) plug-and-play function and hot-line plug/unplug function are supported.

In the IEEE 1394-1995 standards, although a physical, electric structure of a connector, two basic data transfer systems, and the like are defined, it is not defined what type of data is transmitted/received based on what communication protocol in what data format.

Moreover, in Isochronous transfer system of the IEEE 1394-1995 standards, since a response to a sending packet is not defined, there is no guarantee that each Isochronous packet is surely received. Therefore, when a plurality of continuous data are to be securely transferred, or when one file data is segmented into a plurality of data to be securely transferred, Isochronous transfer system cannot be used.

Furthermore, in Isochronous transfer system of the IEEE 1394-1995 standards, even when there is a vacancy in a transfer band, the total number of communications is limited to 64. Therefore, when a large number of communications are performed in a little transfer band, Isochronous transfer system cannot be used.

Additionally, in the IEEE 1394-1995 standards, if bus rest occurs in response to the turning ON/OFF of a node power supply, the connection/disconnection of a node, or the like, data transfer has to be interrupted. In the IEEE 1394-1995 standards, however, when the data transfer is interrupted by the bus reset or an error at the time of transmission, it cannot be known what content of data is lost. Furthermore, in order to return once interrupted transfer, a very intricate communication procedure needs to be carried out.

Here, the bus reset indicates a function of automatically performing the recognition of a new topology and the setting of an address (node ID) allotted to each node. Therefore, the plug-and-play function and the hot-line plug/unplug function can be provided in the IEEE 1394-1995 standards.

Moreover, in the communication system conforming to the IEEE 1394-1995 standards, a communication protocol has not been concretely proposed for segmenting into one or more segment data and continuously transferring a relatively large amount of object data (e.g., still image data, graphic data, text data, file data, program data, and the like) which are required to have no real-time properties but have reliability.

Furthermore, in the communication system conforming to the IEEE 1394-1995 standards, a communication protocol has not been either concretely proposed for realizing data communication among a plurality of apparatuses using a communication system in which data is asynchronously broadcast.

SUMMARY OF THE INVENTION

An object of the present invention is to solve the aforementioned problems.

Another object of the invention is to provide a technique in which object data requiring no real-time properties can continuously and securely be transferred in a data communication system, data communication method, data communication apparatus and digital interface.

A further object of the invention is to provide a technique in which a time interval between continuously transferred data can be optimized in a data communication system, data communication method, data communication apparatus and digital interface, and unnecessary interruption in a series of data transfer can easily, securely and efficiently be prevented.

A still further object of the invention is to provide a technique which can realize an efficient data communication in such a manner that unnecessarily occurring retry can easily and securely be prevented in a data communication system, data communication method, data communication apparatus and digital interface.

As a preferred embodiment for such objects, the present invention discloses a data communication system comprising: a source node for performing asynchronous communication at least once to transfer data comprising one or more segments; one or more destination nodes for receiving the data transferred from the source node; and a controller for setting a logical connection relationship between the source node and the one or more destination nodes, wherein at least one of the source node and the controller controls a timing for performing the asynchronous communication.

As another preferred embodiment, the present invention discloses a data communication system comprising: a source node for performing broadcast communication at least once to transfer data comprising one or more segments based on a logical connection relationship; and one or more destination nodes for receiving the data transferred from the source node based on the logical connection relationship, wherein the source node controls a timing for performing the broadcast communication.

As another preferred embodiment, the present invention discloses a data communication method comprising steps of: setting a logical connection relationship between a source node and one or more destination nodes; performing asynchronous communication at least once to transfer data comprising one or more segments to the one or more destination nodes; controlling a timing for performing the asynchronous communication; and using the logical connection relationship to receive the data transferred using the asynchronous communication.

As another preferred embodiment, the present invention discloses a data communication method comprising steps of: performing broadcast communication at least once to transfer data comprising one or more segments to one or more destination nodes based on a logical connection relationship; controlling a timing for performing the broadcast communication; and receiving the data transferred from the source node based on the logical connection relationship.

As another preferred embodiment, the present invention discloses a data communication method comprising steps of: packetizing data comprising one or more segments into a plurality of communication packets; and successively transferring the communication packets based on a logical connection relationship set with one or more destination nodes, the communication packets being asynchronously transferred after a predetermined time elapses.

As another preferred embodiment, the present invention discloses a data communication method comprising steps of: receiving communication packets successively transferred from a source node based on a logical connection relationship set with the source node, the communication packets being asynchronously transferred after a predetermined time elapses; and writing data included in the communication packets into a memory space common to other apparatuses.

As another preferred embodiment, the present invention discloses a data communication method comprising steps of: setting a logical connection relationship between a source node and one or more destination nodes; notifying the source node and the one or more destination nodes of a connection ID for identifying the logical connection relationship; and setting in the source node a time interval of communication packets successively transferred based on the logical connection relationship.

As another preferred embodiment, the present invention discloses a data communication apparatus comprising: a unit for packetizing data comprising one or more segments into a plurality of communication packets; and a unit for successively transferring the communication packets based on a logical connection relationship set with one or more destination nodes, wherein the communication packets are asynchronously transferred after a predetermined time elapses.

As another preferred embodiment, the present invention discloses a data communication apparatus comprising: a unit for receiving communication packets successively transferred from a source node based on a logical connection relationship set with the source node; and a unit for writing data included in the communication packets into a memory space common to other apparatuses, wherein the communication packets are asynchronously transferred after a predetermined time elapses.

As another preferred embodiment, the present invention discloses a data communication apparatus comprising: a unit for setting a logical connection relationship between a source node and one or more destination nodes and for setting in the source node a time interval of communication packets successively transferred based on the logical connection relationship; and a unit for notifying the source node and the one or more destination nodes of a connection ID for identifying the logical connection relationship.

As another preferred embodiment, the present invention discloses a digital interface comprising: a unit for packetizing data comprising one or more segments into a plurality of communication packets; and a unit for successively transferring the communication packets based on a logical connection relationship set with one or more destination nodes, wherein the communication packets are asynchronously transferred after a predetermined time elapses.

As another preferred embodiment, the present invention discloses a digital interface comprising: a unit for receiving communication packets successively transferred from a source node based on a logical connection relationship set with the source node; and a unit for writing data included in the communication packets into a memory space common to other apparatuses, wherein the communication packets are asynchronously transferred after a predetermined time elapses.

As still further preferred embodiment, the present invention discloses a digital interface comprising: a unit for setting a logical connection relationship between a source node and one or more destination nodes and for setting in the source node a time interval of communication packets successively transferred based on the logical connection relationship; and a unit for notifying the source node and the one or more destination nodes of a connection ID for identifying the logical connection relationship.

Still other objects of the present invention, and the advantages thereof, will become fully apparent from the following detailed description of the embodiments.

BRIEF DESCRIPTION OF THE DRAWINGS

FIG. 7 is an explanatory view showing a transfer model of object data.

FIG. 8 is an explanatory view showing a structure of 1394 interface of the embodiment.

FIG. 9 is a sequence chart showing a response period defined in the first embodiment.

FIG. 15 is a view showing operation for setting a minimum retry period of the embodiment.

FIG. 16 is a view showing types of retry codes of the embodiment.

FIG. 17 is a view showing types of ack codes of the embodiment.

DESCRIPTION OF THE PREFERRED EMBODIMENTS

The preferred embodiments of the present invention will now be descried in detail hereinafter with reference to the accompanying drawings.

Figure 1:
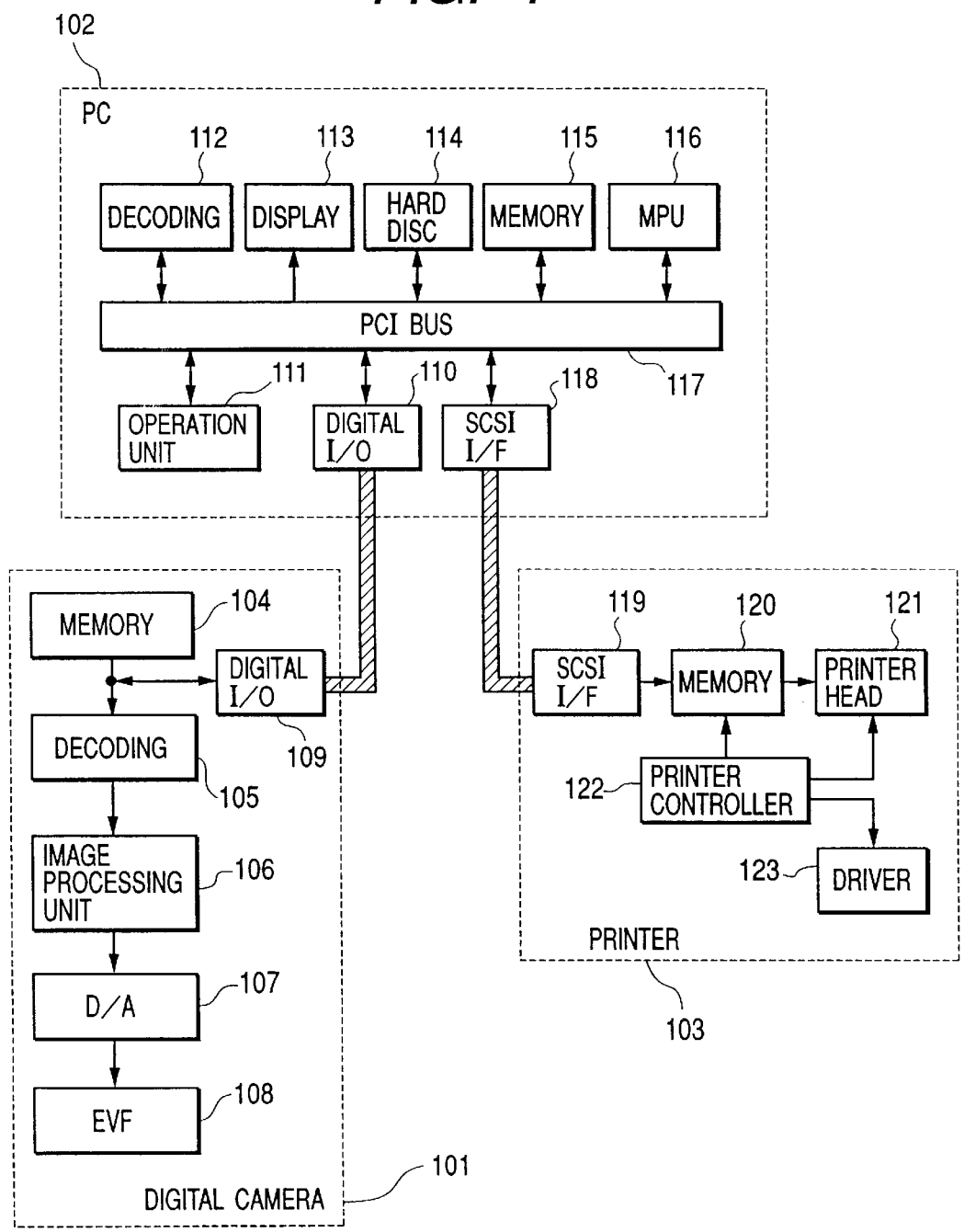
FIG. 1 is an explanatory view of a conventional system.
Figure 2:
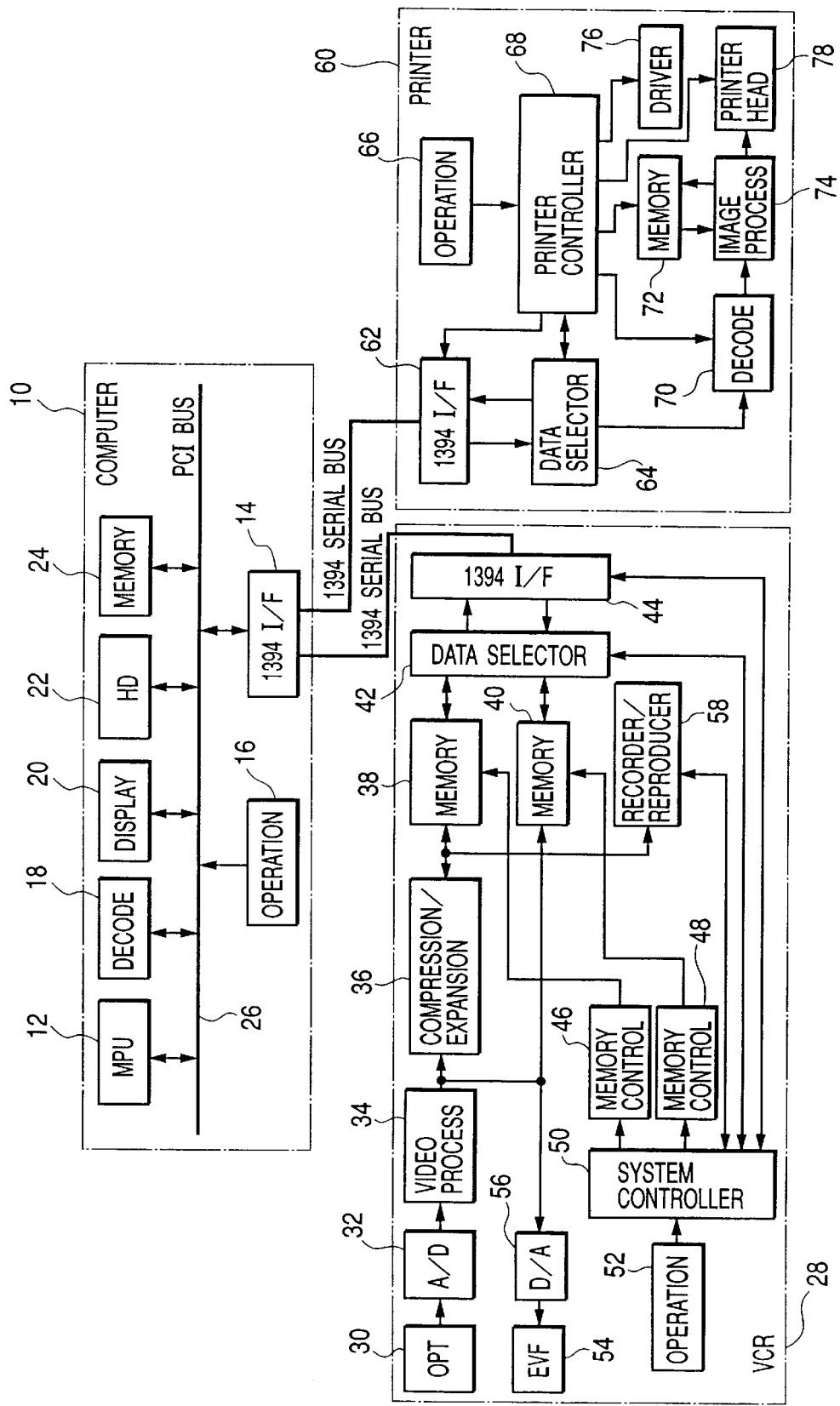
FIG. 2 is a block diagram showing an example of a communication system structure of the embodiment.

FIG. 2 is a view showing an example of a data communication system structure in the embodiment. As shown in FIG. 2, the data communication system of the embodiment is constituted of a computer 10, a digital video camera recorder 28, and a printer 60.

A structure of the computer 10 will first be described. Numeral 12 denotes a microprocessor unit (MPU) for controlling operation of the computer 10. Numeral 14 denotes 1394 interface having a function conforming to IEEE 1394-1995 standards and a function regarding a communication protocol defined in the embodiment. Numeral 16 denotes an operation unit constituted of a keyboard, a mouse, and the like. Numeral 18 denotes a decoder for decoding compressed/encoded digital data (moving image data, still image data, audio data, and the like). Numeral 20 denotes a display constituted of a CRT display, liquid crystal panel or another display device. Numeral 22 denotes a hard disc (HD) for recording various digital data (moving image data, still image data, audio data, graphic data, text data, program data, and the like). Numeral 24 denotes an internal memory. Numeral 26 denotes a PCI bus or internal bus for interconnecting processing units inside the computer 10.

A structure of the digital video camera recorder (hereinafter referred to as DVCR) 28 will next be described. Numeral 30 denotes an image pickup unit (opt) for converting an optical image of an object into an electric signal. Numeral 32 denotes an analog-digital (A/D) converter. Numeral 34 denotes a video processing unit for converting a digitized moving image or a still image to a digital image data of a predetermined format. Numeral 36 denotes a compression/expansion unit having a function of decoding compressed/encoded digital data (moving image data, still image data, audio data, and the like) and a function of encoding digital image data with high efficiency (e.g., the data is orthogonally converted to a predetermined image unit, quantized, and encoded with variable length like in MPEG or DV system). Numeral 38 denotes a memory for temporarily storing the highly efficiently encoded digital image data. Numeral 40 denotes a memory for temporarily storing the digital image data not subjected to the highly efficient encoding. Numeral 42 denotes a data selector. Numeral 44 denotes 1394 interface having the function conforming to the IEEE 1394-1995 standards and the function regarding the communication protocol defined in the embodiment. Numerals 46, 48 denote memory control units for controlling the writing and reading of the memories 38 and 40. Numeral 50 denotes a system controller for controlling operation of DVCR 28, which has a microcomputer. Numeral 52 denotes an operation unit comprising a remote controller, operation panel, and the like. Numeral 54 denotes an electronic view finer (EVF). Numeral 56 denotes a D/A converter. Numeral 58 denotes a recorder/reproducer provided with a magnetic tape, magnetic disc, magnetic optical disc, or another recording medium for recording/reproducing various digital data (moving image data, still image data, audio data, and the like).

A structure of the printer 60 will next be described. The printer 60 comprises 1394 interface 62 having the function conforming to the IEEE 1394-1995 standards and the function regarding the communication protocol defined in the embodiment; a data selector 64; an operation unit 66 constituted of operation buttons, a touch panel, and the like; a printer controller 68 for controlling operation of the printer 60; a decoder 70; an internal memory 72; an image processing unit 74 for processing still image data, text data, graphic data and the like received via the 1394 interface; a driver 76; and a printer head 78.

As shown in FIG. 2, for each communication apparatus (hereinafter referred to as the node), the computer 10, the DVCR 28 and the printer 60 are interconnected via the 1394 interfaces 14, 44, 62 (a network comprising the 1394 interface will hereinafter be referred to as the 1394 serial bus). In each node, various object data (e.g., moving image data, still image data, audio data, graphic data, text data, program data, and the like) can be transmitted/received, and remote operation can be realized using command data by defining the predetermined communication protocol. In the embodiment, the communication protocol using Asynchronous transfer system is defined.

Operation of the nodes constituting the communication system of the embodiment will next be described with reference to FIG. 2.

First, the function and operation of the processing units constituting the computer 10 will be described.

In the embodiment, the computer 10 serves as a controller for controlling transmission/reception of image data between DVCR 28 and printer 60, or a controller for remotely operating DVCR 28 and printer 60.

The MPU 12 executes software recorded in the hard disc 22 and moves various data to the internal memory 24. Moreover, the MPU 12 performs an operation for adjusting the processing units connected via the internal bus 26.

The 1394 interface 14 can receive the image data transferred onto the 1394 serial bus and also transmit the image data recorded in the hard disc 22 and the internal memory 24 to the 1394 serial bus. Moreover, the 1394 interface 14 can transmit the command data for remotely operating the other nodes on the 1394 serial bus. Furthermore, the 1394 interface 14 also has a function of transferring to the other nodes the signal transferred via the 1394 serial bus.

A user selects a desired software via the operation unit 16, and causes the MPU 12 to operate the software recorded in the hard disc 22. Here, the information regarding the software is presented to the user by the display 20. The decoder 18 decodes the image data received on the 1394 serial bus based on the software. The decoded image data is presented to the user by the display 20.

The function and operation of the processing units constituting the DVCR 28 will next be described.

In the embodiment the DVCR 28 serves, for example, as an image transmission device (source node) for performing Asynchronous transfer of the image data based on the communication protocol of the embodiment.

The image pickup unit 30 converts an optical image of the object into the electric signal constituted of a luminance signal Y and a color difference signal C, and supplies the electric signal to the A/D converter 32. The A/D converter 32 digitizes the electric signal.

The video processing unit 34 applies a predetermined image processing to the digitized luminance signal and color difference signal, and multiplexes the signals. The compression/expansion unit 36 compresses the data amount of the digitized luminance signal and color difference signal. Here, the compression/expansion unit 36 uses an independent compression processing circuit to process the luminance signal and the color difference signal in parallel. Alternatively, the unit may use a common compression processing circuit to process the signals in time division.

Moreover, in order to be resistant to errors in transmission paths, the compression/expansion unit 36 applies a shuffling processing to the compressed image data. Thereby, a continuous code error (i.e., burst error) can be converted to a discrete error (i.e., random error) which can easily be repaired or interpolated. Here, when a deviation of information amount due to a coarse image in screen is uniformed, this process may preferably be performed prior to the compression process, which is convenient for the encoding with a variable run length or another length.

In the compression/expansion unit 36, data identification information ID is added to the compressed image data in order to restore the shuffling. The compression/expansion unit 36 adds an error correction code ECC to the compressed image data in order to reduce errors at the time of recording/ reproducing.

The image data compressed in the compression/expansion unit 36 is supplied to the memory 38 and the recorder/ reproducer 58. The recorder/reproducer 58 records the compressed image data with ID and ECC added thereto to the magnetic tape or another storage medium. Here, the compressed image data is recorded into a recording area different from or independent of an area for the audio data.

On the other hand, the image data supplied to the D/A converter 56 from the video processing unit 34 is D/A converted. The EVF 54 indicates an analog image signal supplied from the D/A converter 56. Moreover, the image data processed in the video processing unit 34 is also supplied to the memory 40. Here, non-compressed image data is stored in the memory 40.

The data selector 42 selects the memory 38 or 40 based on user's instruction, and supplies the compressed image data or the non-compressed image data to the 1394 interface 44. Moreover, the data selector 42 supplies the image data supplied from the 1394 interface 44 to the memory 38 or 40.

The 1394 interface 44 performs Asynchronous transfer of the compressed image data or the non-compressed image data based on the communication protocol of the embodiment as described later. Moreover, the 1394 interface 44 receives a control command for controlling the DVCR 28 via the 1394 serial bus. The received control command is supplied to the system controller 50 via the data selector 42. The 1394 interface 44 returns a response to the control command.

The function and operation of each processing unit constituting the printer 60 will now be described.

In the embodiment the printer 60 serves, for example, as an image receiving device (destination node) for receiving and printing the image data asynchronously transferred based on the communication protocol of the embodiment.

The 1394 interface 62 receives the image data or the control command asynchronously transferred via the 1394 serial bus. Moreover, the 1394 interface 62 sends a response to the control command.

The received image data is supplied to the decoder 70 via the data selector 64. The decoder 70 decodes the image data, and transmits results to the image processing unit 74. The image processing unit 74 temporarily stores the decoded image data to the memory 72.

Moreover, the image processing unit 74 converts the image data temporarily stored in the memory 72 to data to be printed, and supplies the data to the printer head 78. The printer head 78 performs printing under control of the printer controller 68.

On the other hand, the received control command is transmitted to the printer controller 68 via the data selector 64. The printer controller 68 performs various controls regarding the printing based on the control data. For example, the sheet feeding by the driver 76, the position of the printer head 78, and the like are controlled.

A structure of the 1394 interfaces 14, 44, 62 of the embodiment will next be described in detail with reference to FIG. 8.

The 1394 interface is functionally constituted of a plurality of layers. In FIG. 8, the 1394 interface is connected to the 1394 interface of another node via a communication cable 801 conforming to the IEEE 1394-1995 standards. Moreover, the 1394 interface has at least one communication port 802, and each communication port 802 is connected to a physical layer 803 included in hardware.

In FIG. 8, the hardware is constituted of the physical layer 803 and a link layer 804. The physical layer 803 performs physical, electrical interface with the other nodes, detection of bus reset and processing, encoding/decoding of input/ output signals, reconciliation of bus using rights, and the like. Moreover, the link layer 804 performs generation of communication packet, transmission/reception of various communication packets, control of a cycle timer, and the like. Furthermore, the link layer 804 provides a function of generating and transmitting/receiving Asynchronous broadcast packet as described later.

Moreover, in FIG. 8, firmware includes a transaction layer 805 and a serial bus management 806. The transaction layer 805 controls Asynchronous transfer system, and provides various transactions (read, write, lock). Furthermore, the transaction layer 805 provides a function of Asynchronous broadcast transaction as described later. The serial bus management 806 provides functions for controlling self node, and for managing connection state of the self node, ID information of the self node, and source of serial bus network on the basis of IEEE 1212 CSR standard described later.

The hardware and firmware shown in FIG. 8 substantially constitute the 1394 interface, and basic structures are defined by the IEEE 1394-1995 standards.

Moreover, an application layer 807 included in software varies with application soft for use, and it is controlled how and what object data is transferred.

The communication protocol of the embodiment described later expands the function of the hardware and firmware constituting the 1394 interface, and provides the software with a new transfer procedure.

A basic structure of the communication protocol defined in the embodiment will next be described with reference to FIG. 3.

Figure 3:
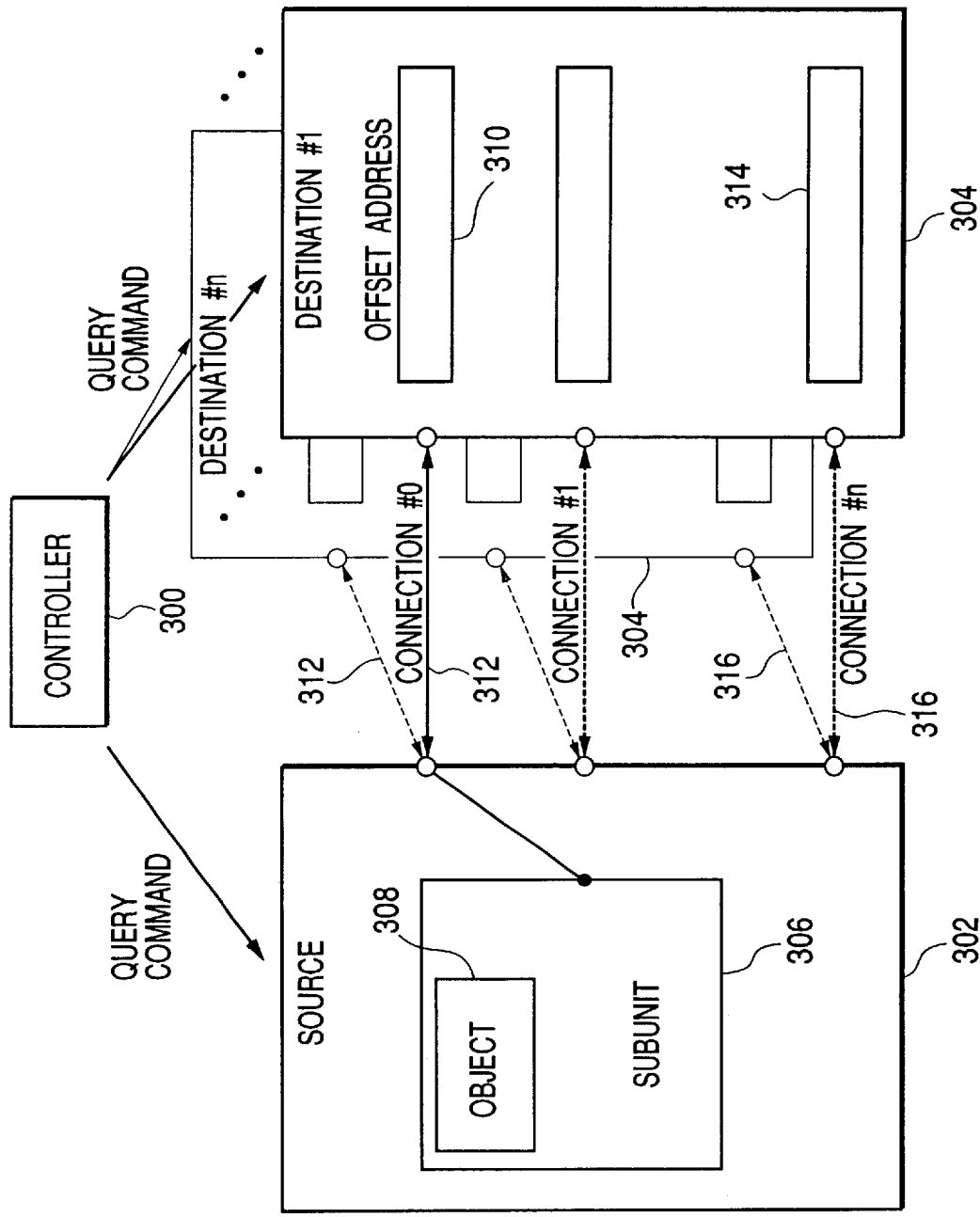
FIG. 3 is a schematic view showing a basic structure of communication protocol of the embodiment.

FIG. 3 shows a controller 300, a source node 302, n (n≧1) destination nodes 304, a subunit 306 of the source node, and an object 308 such as still image data, graphic data, text data, file data, program data, and the like.

A first memory space 310 provided inside the destination node 304 is designated by a predetermined destination offset (destination_offset #0). A first connection 312 indicates a logical connection relationship (that is, connection) between the source node 302 and the destination node 304. Here, the destination offset means an address for designating in common the memory space of the n destination nodes 304.

N-th memory space 314 provided inside the destination node 304, is designated by a predetermined destination offset (destination_offset #n). An n-th connection 316 indicates a logical connection relationship (that is, connection) between the source node 302 and the destination node 304.

In the embodiment, each node controls the first memory space 310 to the n-th memory space 314 by an address space of 64 bits conforming to IEEE 1212 CSR (Control and Status Register Architecture) standards (or ISO/IEC 13213: 1994 standards). The IEEE 1212 CSR standards define control for serial bus, management, or address allotment.

Figure 6A:
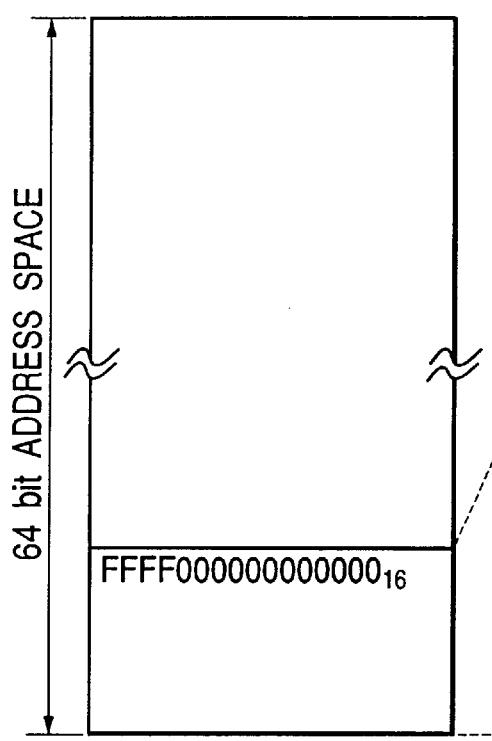
FIGS. 6A and 6B are explanatory views showing an address space of each node.
Figure 6B:
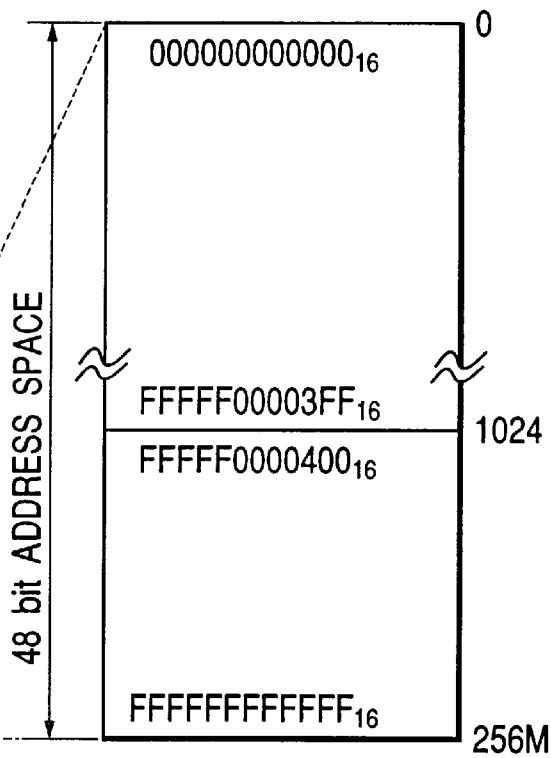

FIGS. 6A and 6B are explanatory views of the address space of each node. FIG. 6A shows a logical memory space represented by the address of 64 bits. Moreover, FIG. 6B shows a part of the address space shown in FIG. 6A, for example, an address space in which high-order 16 bits form $FFFF_{16}$. As the first memory space 310 to the n-th memory space 314 shown in FIG. 3, a part of the memory space shown in FIG. 6B is used. Each of the memory spaces 310 to 314 is defined by the destination offset indicating low-order 48 bits of the address.

In FIG. 6B, for example, $000000000000_{16}$ to $0000000003FF_{16}$ are reserved areas, and the areas where the object data 308 is actually written are areas from $FFFFF0000400_{16}$ indicating low-order of the 48 bits.

In FIG. 3, the source node 302 has a function of transferring the object data 308 in accordance with the communication protocol described later, while the destination node 304 has a function of receiving the object data 308 transferred from the source node 302. Moreover, the controller 300 establishes the logical connection relationship (that is, connection) between the source node 302 and at least one destination node 304 in accordance with the communication protocol described later, and controls the connection.

Here, the controller 300, the source node 302, and the destination node 304 may function in separate. Moreover, the controller 300 and the source node 302 may function in the same node. Furthermore, the controller 300 and the destination node 304 may function in the same node. In this case, no transaction is necessary between the controller 300 and the source node 302 or the destination node 304, which simplifies the communication procedure.

In the embodiment, a case where the controller 300, the source node 302, and the destination node 304 separately function in independent nodes will be described. For example, the computer 10 provided with the 1394 interface 14 serves as the controller 300. Moreover, the DVCR 28 provided with the 1394 interface 44 serves as the source node 302, while the printer 60 provided with the 1394 interface 62 serves as the destination node 304.

In the embodiment, as shown in FIG. 3, at least one connection can be set between the source node 302 and at least one destination node 304. When there is a request for transfer of certain object data, these connections are set by at least one controller 300 based on the communication protocol described later.

In the embodiment, one or more destination offsets usable in one connection can be set. The value of the destination offset may be preset or set variably by the controller 300 or the source node 302. Additionally, a relationship of the connection and the destination offset is set based on the communication protocol described later.

When a plurality of destination offsets are set in one connection, a plurality of modes of data communication can simultaneously be realized with one connection. For example, one to one, one to N, N to N data communication can simultaneously be realized with one connection by allocating different destination offsets to the modes of the data communication.

Additionally, in the embodiment, the computer 10 as the controller 300 may operate as the destination node 304. In this case, a connection is set between one source node 302 and two destination nodes 304, and the object data 308 is transferred.

Moreover, in the embodiment, the case where the computer 10 serves as the controller 300 has been described, but the computer 10 does not necessarily have to function as the controller 300. The DVCR 28 or the printer 60 may operate as the controller 300.

First Embodiment

A basic transfer procedure of the communication protocol defined in the first embodiment will next be described.

Figure 4A:
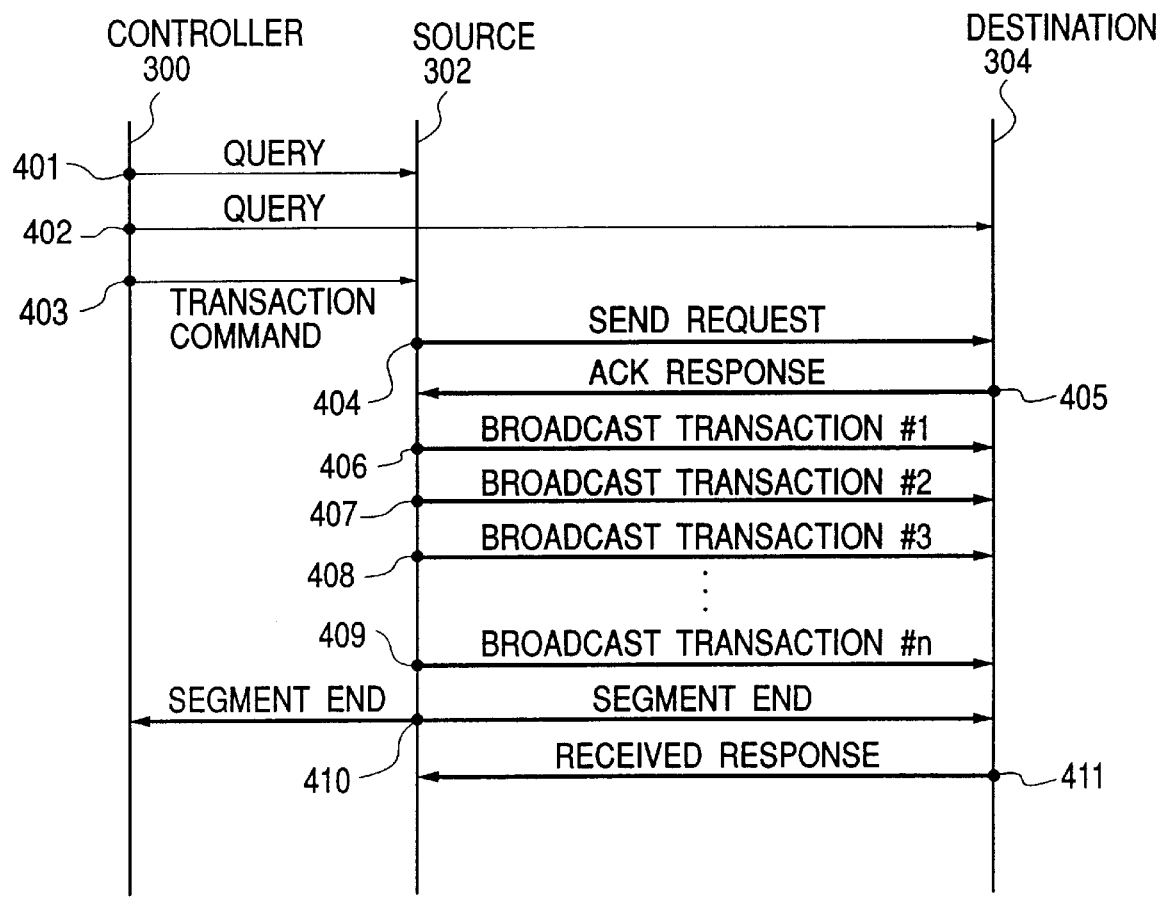
FIGS. 4A, 4B and 4C are sequence charts showing a basic communication procedure of the communication protocol of a first embodiment.
Figure 4B:
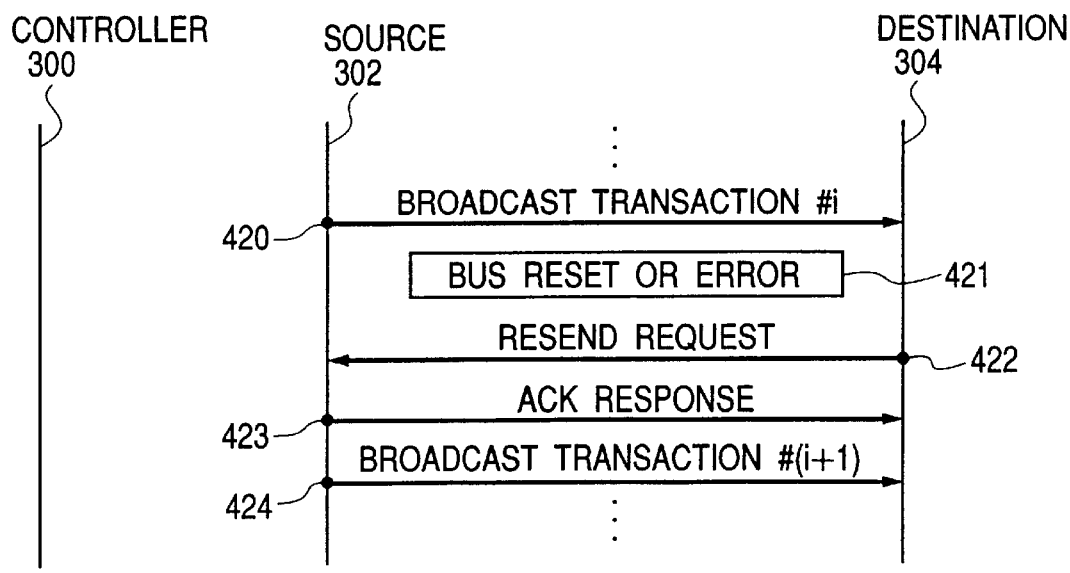
Figure 4C:
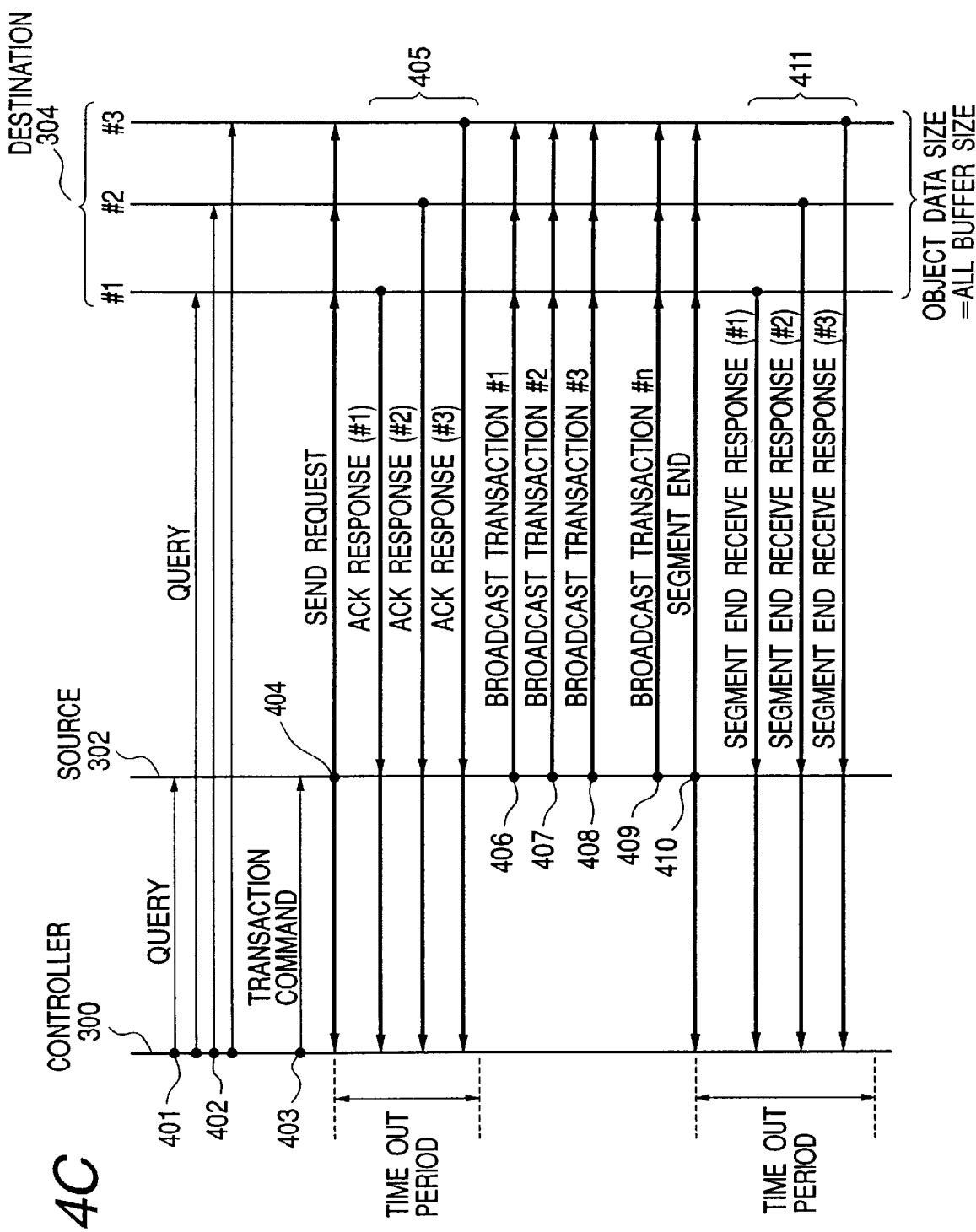

FIGS. 4A, 4C are sequence charts showing a procedure performed until one object data is transferred. FIG. 4B shows a sequence chart showing a transfer procedure if bus reset or transmission error occurs during the transfer of one object data.

In the communication protocol of the embodiment, after the aforementioned connection is set by the controller 300, one object data is transferred at least one Asynchronous broadcast transaction. A detailed communication procedure of Asynchronous broadcast transaction will be described with reference to FIG. 4. Additionally, a packet for use in Asynchronous broadcast transaction (hereinafter referred to as Asynchronous broadcast packet) will be described with reference to FIG. 5.

Additionally, the Asynchronous broadcast transaction and Asynchronous broadcast packet are completely new communication procedure and packet format defined in the communication protocol of the embodiment.

The basic transfer procedure based on the communication protocol of the embodiment will be described hereinafter with reference to FIGS. 4A, 4C. Here, FIG. 4A is a sequence chart showing a case where data communication is performed with one destination node 304 in one connection. Moreover, FIG. 4C is a sequence chart showing a case where data communication is performed with three destination nodes 304 in one connection.

The controller 300 sets connection ID for identifying the logical connection relationship (connection) between the source node 302 and at least one destination node 304. Subsequently, the controller 300 notifies each node of the connection ID, and sets one connection (401, 402 of FIGS. 4A, 4C).

After the notification of the connection ID, the controller 300 commands the source node 302 to start the transfer of the object data 308 (403 of FIGS. 4A, 4C).

After receiving the transaction command, the source node 302 executes negotiation with at least one destination node 304 to perform initialization of Asynchronous broadcast transaction (404, 405 of FIGS. 4A, 4C).

After the initialization setting is completed, the source node 302 performs Asynchronous broadcast transaction to successively broadcast the object data 308 constituted of one or more segment data (406 to 409 of FIGS. 4A, 4C)

Here, a transfer model of object data in the embodiment will be described with reference to FIG. 7. In FIG. 7, the object data is, for example, still image data with a data size of 128 Kbytes.

The source node 302 segments the object data 308, for example, into 500 pieces of segment data (one piece of segment data corresponds to 256 bytes) in accordance with reception ability of each destination node 304 recognized in the initialization setting. Here, the size of one segment data is variously set by the source node 302 in accordance with the size of an internal buffer of each destination node 304. FIG. 7 shows a case where the internal buffer with the same size as the size of the object data 308 is secured.

Moreover, the source node 302 transfers one or more segment data using at least one Asynchronous broadcast transaction. In FIG. 7, one segment data is transferred using one Asynchronous broadcast transaction.

After the transfer of all the segment data, the source node 302 completes the data communication with at least one destination node 304 (410, 411 of FIGS. 4A, 4C).

The operation of the controller 300 will next be described in detail with reference to FIGS. 4A, 4C.

The controller 300 conducts negotiations to set connection between the source node 302 and at least one destination node 304 selected by the user. Subsequently, the controller 300 performs Asynchronous transfer of a packet for setting the connection between the nodes (hereinafter referred to as the connection setting packet) (401, 402 of FIGS. 4A, 4C).

In this case, each destination node 304 notifies the controller 300 of a self allowable interval time (data transfer delay shown in FIG. 9). The controller 300 dynamically determines an optimum period of time (response period shown in FIG. 9) in which the source node 302 is on standby in each Asynchronous broadcast transaction, based on the interval time of each destination node 304. For example, the maximum value of the interval time of each destination node 304 is determined. The period is notified to the source node 302 along with the connection setting packet.

Additionally, the period is set longer than the interval time. Moreover, the interval time dynamically changes with the reception ability and performance of the destination node 304. Therefore, the interval time is shortened when the reception ability and performance are high, while it is lengthened when they are low.

The connection ID indicating the connection between the source node 302 and the destination node 304 is stored in a payload of the connection setting packet. Each node identifies its set connection by the connection ID. Additionally, the connection is set by the controller 300 based on the connection ID already set to the source node 302 and the connection ID already set to each destination node 304.

Subsequently, the controller 300 performs Asynchronous transfer of a transmission command packet (transaction command packet) to the source node 302 (403 of FIGS. 4A, 4C).

Upon receipt of the transmission command packet, the source node 302 performs the initialization setting by using the connection ID notified from the controller 300 to execute Asynchronous broadcast transaction (404 to 409 of FIGS. 4A, 4C). Through the Asynchronous broadcast transaction, the source node 302 can successively transfer the object data 308 constituted of one or more segment data.

Additionally, in the communication protocol of the embodiment, the controller 300 provides a function of controlling connection/disconnection. Therefore, after the connection is set, the object data 308 is transferred by the negotiation between the source node 302 and the destination node 304.

After a series of Asynchronous broadcast transactions are completed, the source node 302 broadcasts Asynchronous broadcast packet indicating a segment end (hereinafter referred to as the segment end packet) (410 of FIGS. 4A, 4C).

After receiving the segment end packet from the source node 302, the connection is released to complete the data transfer (411 of FIGS. 4A, 4C).

Here, since the segment end packet is broadcast, the content of the packet can be detected even in the destination node 304. Therefore, instead of the controller 300, the destination node 304 may release the connection from the source node 302.

The operation of the source node 302 will next be described in detail with reference to FIGS. 4A, 4C.

The source node 302 having received the connection setting packet and the transaction command packet from the controller 300 transmits Asynchronous broadcast packet (hereinafter referred to as the send request packet) to each destination node 304 requesting for data transfer (404 of FIGS. 4A, 4C).

Here, the send request packet means a request packet for obtaining necessary initial information before executing Asynchronous broadcast transaction of the object data 308. The connection ID designated by the controller 300 is written in the packet.

The destination node 304 broadcasts Asynchronous broadcast packet (hereinafter referred to as the ack response packet) indicative of a response corresponding to the send request packet (405 of FIGS. 4A, 4C). Here, the same connection ID as that in the send request packet is stored in the ack response packet. Therefore, the source node 302 can identify via which connection the ack response packet is transferred, by confirming the connection ID of the received packet.

Here, the size of the internal buffer in which each destination node 304 can be secured, and an offset address for designating the predetermined memory space are stored in the ack request packet. After receiving the ack request packet, the source node 302 sets the destination offset for designating a common memory space for the destination nodes 304, and starts Asynchronous broadcast transaction. Here, the destination offset is set by using the offset address included in the ack request packet of each destination node 304.

Additionally, in the embodiment, the destination offset used in Asynchronous broadcast transaction is set using the offset address included in the ack request packet, which is not limited. For example, the controller 300 may be provided with a function of controlling the destination offset used by each connection, so that the destination offset is set along with the connection ID. In this case, the destination offset corresponding to each connection is notified to the source node 302 from the controller 300.

Moreover, each destination node 304 may directly notify the source node of the interval time using the ack request packet. In this case, instead of the controller 300, the source node 302 dynamically determines an optimum period of time in which the source node 302 is on standby in each Asynchronous broadcast transaction.

Subsequently, the source node 302 writes the first Asynchronous broadcast packet in the memory space indicated by the destination offset (406 of FIGS. 4A, 4C). The connection ID and the sequence number of the segment data are stored in the packet.

After transmitting the first Asynchronous broadcast packet, the source node 302 waits for a response packet from the destination node 304. The destination node 304 transmits the response packet in which the connection ID and the sequence number are stored, in the format of Asynchronous broadcast packet. After receiving the response packet, the source node 302 increments the sequence number, and transfers Asynchronous broadcast packet including the next segment data (407 of FIGS. 4A, 4C).

The source node 302 repeats the procedure to successively perform Asynchronous broadcast transaction (408, 409 of FIGS. 4A, 4C). The period of time in which the response from the destination node 304 is waited for is determined by the interval time. The period of time is referred to as the response period in the embodiment.

For example, even after the response period elapses after Asynchronous broadcast transaction of the i-th segment data, the response packet cannot be received. In this case, the source node 302 resends the same Asynchronous broadcast packet as that of the i-th segment data.

Moreover, when the response packet is transferred from the destination node 304 requesting for resend, the source node 302 can broadcast the data of the designated sequence number again.

After Asynchronous broadcast packet transaction of all the object data 308 is performed, the source node 302 broadcasts the segment end packet, and completes the data transfer (410, 411 of FIGS. 4A, 4C).

Here, as described above, the source node 302 segments the object data 308 into one or more segment data as required. In Asynchronous broadcast transaction of each segment data, the aforementioned response packet is generated. One segment data is transferred by performing Asynchronous broadcast transaction once. The destination node 304 has the volume of buffer, which is indicated by the buffer size.

Additionally, in the embodiment, the response packet is necessarily sent out in Asynchronous broadcast transaction of one segment data, which is not limited. After the data buffer of the destination node 304 is filled with a plurality of continuous segment data, the destination node 304 may transmit the response packet. In the structure, since the frequency of the response operation performed by the destination node 304 can be reduced, the structure of the destination node 304 can be simplified, and the processing rate can be enhanced.

The operation of the destination node 304 will next be described in detail with reference to FIGS. 4A, 4C.

The destination node 304 having received the connection setting packet from the controller 300 waits for the send request packet from the source node 302 (404 of FIGS. 4A, 4C).

The destination node 304 having received the send request packet confirms the connection ID written in the packet and the connection ID notified from the controller, and determines whether or not the packet is transferred from the source node 302.

After receiving the send request packet from the source node 302, each destination node 304 broadcasts the connection ID, the size of the internal buffer which can be secured, and the ack response packet in which the offset address designating the predetermined memory space is written (405 of FIGS. 4A, 4C). Additionally, each destination node 304 may directly notify the source node 302 of the interval time by using the send request packet.

After the Asynchronous broadcast packet transferred from the source node 302 is written in the memory space, the destination node 304 confirms the connection ID of the packet. When the connection ID included in the packet coincides with the connection ID of the destination node 304 itself, the response packet in which the connection ID and the sequence number are stored is broadcast (406 to 409 of FIGS. 4A, 4C). In this case, the segment data included in the received packet is stored in the internal buffer. Here, when the connection ID included in the received packet is different from its connection ID, the destination node 304 discards the received packet.

Moreover, when the destination node 304 detects mismatching of the sequence number of the received packet, the response packet may be sent out requesting for resend. In this case, the destination node 304 designates the sequence number for the resend request, and notifies the source node 302 of the number.

When all the Asynchronous broadcast transactions are completed, the segment end packet is broadcast from the source node 302. Upon receiving the packet, the destination node 304 completes the data transfer process (410 of FIGS. 4A, 4C).

After receiving the segment end packet, the destination node 304 broadcasts the response packet indicating that the segment end packet is normally received (411 of FIGS. 4A, 4C).

As described above, the communication system of the embodiment can solve inconveniences of the conventional communication system. Moreover, even in the data transfer requiring no real-time properties, the data can easily be transferred at high speeds.

Furthermore, in the embodiment, after the controller 300 sets the connection, the process of transferring the object data is performed between the source node 302 and each destination node 304 without being controlled by the controller 300. Therefore, there can be provided a simple communication protocol in which the load of the controller 300 is reduced and no complicated communication procedure is necessary.

Additionally, in the embodiment, the destination node 304 is sure to send a response to each Asynchronous broadcast transaction. Therefore, there can be provided a communication protocol in which the data requiring no real-time properties can securely be transferred.

In order to realize more secure data transfer, when the data transfer is interrupted by occurrence of the bus reset or any transmission error, the data transfer needs to be instantly resumed without dropping any data. A resuming procedure defined in the communication protocol of the embodiment will be described hereinafter with reference to FIG. 4B.

For example, when the bus reset occurs after Asynchronous broadcast packet with a sequence number i is received, each node discontinues the transfer process, and executes bus initialization, recognition of connection structure, setting of node ID, and the like in accordance with the procedure defined in the IEEE 1394-1995 standards (420, 421 of FIG. 4B).

After bus reconstruction is completed, each destination node 304 broadcasts a resend request packet in which the connection ID and the sequence number i are stored (422 of FIG. 4B).

When Asynchronous broadcast transaction can be resumed, the source node 302 confirms the connection ID of the received resend request packet to broadcast the ack response packet in which the connection ID is stored (423 of FIG. 4B).

Subsequently, the source node 302 successively broadcasts the segment data of and after the sequence number requested by the received resend request packet, i.e., the sequence data starting with sequence number i+1 (424 of FIG. 4B).

In the aforementioned procedure, even if the data transfer is interrupted, the controller 300, the source node 302, and the destination node 304 can easily and securely resume the subsequent data transfer without considering each node ID.

Moreover, as described above, in the embodiment, even when the data transfer is interrupted, the control procedure of the controller 300 can effectively be simplified.

The structure of Asynchronous broadcast packet defined in the embodiment will next be described with reference to FIG. 5. Asynchronous broadcast packet is, for example, data packet having a unit of 1 Quadlet (4 bytes=32 bits).

First, a structure of packet header 521 will be described.

Figure 5:
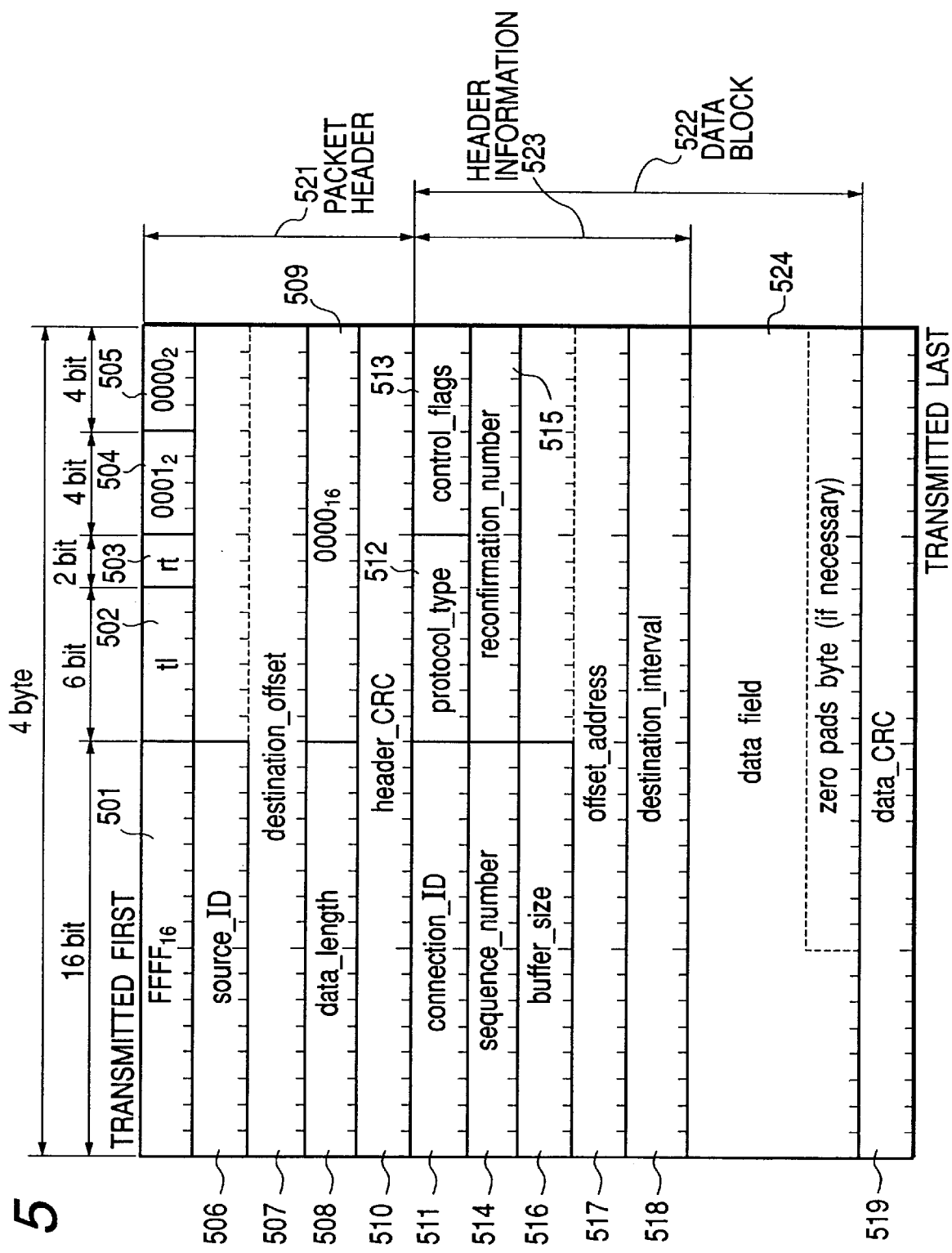
FIG. 5 is a view showing a structure of Asynchronous broadcast packet of the first embodiment.

In FIG. 5, a field 501 (16 bits) indicates destination ID, and a node ID of a destination (i.e., destination node 304). In the communication protocol of the embodiment, in order to realize Asynchronous broadcast transaction of the object data 308, a value of the field is set as broadcasting ID (i.e., $FFFF_{16}$).

A field 502 (6 bits) indicates a transaction label (tl) field, or a tag peculiar to each transaction.

A field 503 (2 bits) indicates a retry (rt) code, and designates whether or not the packet makes a retry.

A field 504 (4 bits) indicates a transaction code (tcode), which designates a packet format or a transaction type to be executed. In the embodiment, a value of the field is set, for example, to $0001_2$ to request for a process of writing a data block 522 of the packet into the memory space indicated by a destination_offset field 507 (i.e., write transaction).

A field 505 (4 bits) indicates a priority (pri), and designates the order of priority. In the embodiment, a value of the field is set to $0000_2$.

A field 506 (16 bits) indicates source_ID, or the node ID of the transmission side (i.e., source node 302).

The field 507 (48 bits) indicates destination_offset, and designates low-order 48 bits of the address space of each destination node 304 in common. Here, for destination_offset, the same value may be set in all the connections, or different values may be set in the connections. However, when the different values are set, Asynchronous broadcast packets from a plurality of connections can efficiently be processed in parallel.

A field 508 (16 bits) indicates data_length, and indicates a length of data field described later in units of bytes.

A field 509 (16 bits) indicates extended_tcode. In the embodiment, a value of the field is set to $0000_{16}$.

A field 510 (32 bits) indicates header_CRC, in which error detecting codes for the fields 501 to 509 are stored.

A structure of the data block 522 will next be described. In the embodiment, the data block 522 is constituted of a header information 523 and a data field 524.

A connection ID for identifying a logical connection relationship between the nodes, and the like are stored in the header information 523.

Moreover, the data field 524 has a variable length, in which the segment data is stored. Here, when the segment data stored in the data field 524 is not a multiple of Quadlet, a portion not satisfying Quadlet is filled with zero.

A field 511 (16 bits) indicates connection_ID, and stores the connection ID of the embodiment. The 1394 interface of the embodiment identifies the connection set between the source node 302 and at least one destination node 304 based on the connection ID stored in the field. In the embodiment, connections of $2^{16}$×the number of nodes can be established. Therefore, a plurality of connections can be set until the total amount of communication band used by each connection reaches the volume of the transmission path.

A field 512 (8 bits) indicates protocol_type, and communication procedure based on the header information 523 (i.e., communication protocol type) is indicated. When the communication protocol of the embodiment is indicated, a value of the field is, for example, $01_{16}$.

A field 513 (8 bits) indicates control_flags, and predetermined control data for controlling communication procedure and the like of the communication protocol of the embodiment are set. In the embodiment, a most significant bit of the field is set, for example, as a resend_request flag. Therefore, when the most significant bit of the field has a value of 1, it is indicated that the resend request based on the communication protocol of the embodiment is generated.

A field 514 (16 bits) indicates sequence_number, and a continuous value (i.e., sequence number) is set to a packet transferred based on a specified connection ID (connection ID designated by the field 511). The destination node 304 can monitor continuity of segment data successively subjected to Asynchronous broadcast transaction by the sequence number. When an inequality occurs, the destination node 304 can request for resend based on the sequence number.

A field 515 (16 bits) indicates reconfirmation_number. In the embodiment the field has a meaning only when the resend request flag has a value of 1. For example, when the value of the resend request flag is 1, the sequence number of the packet requesting for resend is set in the field.

A field 516 (16 bits) indicates buffer_size. The buffer size of the destination node 304 is set in the field.

A field 517 (48 bits) indicates offset_address. Low-order 48 bits of the address space of the destination node 304 are stored in the field. Therefore, any one of first memory space 310 to n-th memory space 314 shown in FIG. 3 is designated.

A field 518 (32 bits) indicates destination_interval. The interval time is stored in the field. Each destination node 304 notifies the source node 302 and the controller 300 of the interval time by the field.

A field 519 (32 bits) indicates data_CRC, and error detecting codes for the fields 511 to 518 (including the header information 523 and the data field 524) are stored in the same manner as the header_CRC.

The communication protocol of the first embodiment will next be described in detail with reference to FIG. 9.

In FIG. 9, particularly a time interval between a time when the i-th (i being an optional integer) Asynchronous broadcast transaction is executed and a time when the (i+1)-th Asynchronous broadcast transaction is executed will be described in detail. Additionally, in FIG. 9, to simplify the description, transfer between one source node 302 and one destination node 304 is shown, but the same processing can be performed even when more than one destination node 304 are provided.

FIG. 9 shows an internal buffer 252 of the destination node 304; a next-stage circuit 254 for processing data of the internal buffer 252; an i-th Asynchronous broadcast packet 256; a response packet 258 corresponding to the i-th Asynchronous broadcast packet; an (i+1)-th Asynchronous broadcast packet 260; a response packet 262 corresponding to the (i+1)-th Asynchronous broadcast packet; a response period 267; data movement 266 inside the destination node 304 (from internal buffer 252 to next-stage circuit 254); and a delay time 268 in the data movement inside the destination node 304.

When the i-th Asynchronous broadcast transaction is started, the i-th Asynchronous broadcast packet 256 is transferred from the source node 302. The destination node 304 temporarily stores the segment data included in the packet into the internal buffer 252 via the predetermined memory space, and then the segment data moves to the next-stage circuit 254.

When the movement of the segment data is completed, the destination node 304 prepares the response packet 258 indicative of the completion, and transfers the packet to the source node 302. In this case, the delay time 268 dependent on the performance of the destination node 304 is generated in the transfer of the response packet 258 along with data movement 266 inside the destination node 304.

Expected delay time 268 of the destination node 304 is notified as the interval time to the source node 302 from the controller 300 beforehand. The source node 302 determines the response period 264 based on the interval time. During this time, the source node 302 waits for the response packet from the destination node 304, and executes no next Asynchronous broadcast transaction. Here, the response period 264 is usually set longer than the interval time.

For the (i+1)-th Asynchronous broadcast transaction, processing is performed in the same procedure as in the i-th Asynchronous broadcast transaction. Subsequently, since each Asynchronous broadcast transaction is processed in the same manner, all the Asynchronous broadcast packets are securely transferred without being resent.

In the aforementioned structure, at the time of setting the connection the controller 300 (or the source node 302) of the first embodiment can dynamically set the optimum response period in accordance with the reception ability and performance of each destination node 304. For example, the period is set short when the reception ability and performance of the destination node 304 are high, while the period is set long when they are low.

Therefore, even when the performance of each destination node 304 is not very high, the source node 302 can securely execute each Asynchronous broadcast transaction without frequently generating the resending process. Moreover, the transfer efficiency in the network is prevented from being lowered. Additionally, since the destination node 304 does not require high-speed, high-function reception ability, costs necessary for realizing the function of the destination node 304 can be reduced.

Second Embodiment

A communication protocol of a second embodiment will be described hereinafter with reference to FIGS. 10 to 16. In the second embodiment, particularly a procedure for preventing a retry from being unnecessarily generated will be described in detail. The retry is inhibited only for a predetermined time when an i-th data is not normally received.

Figure 10:
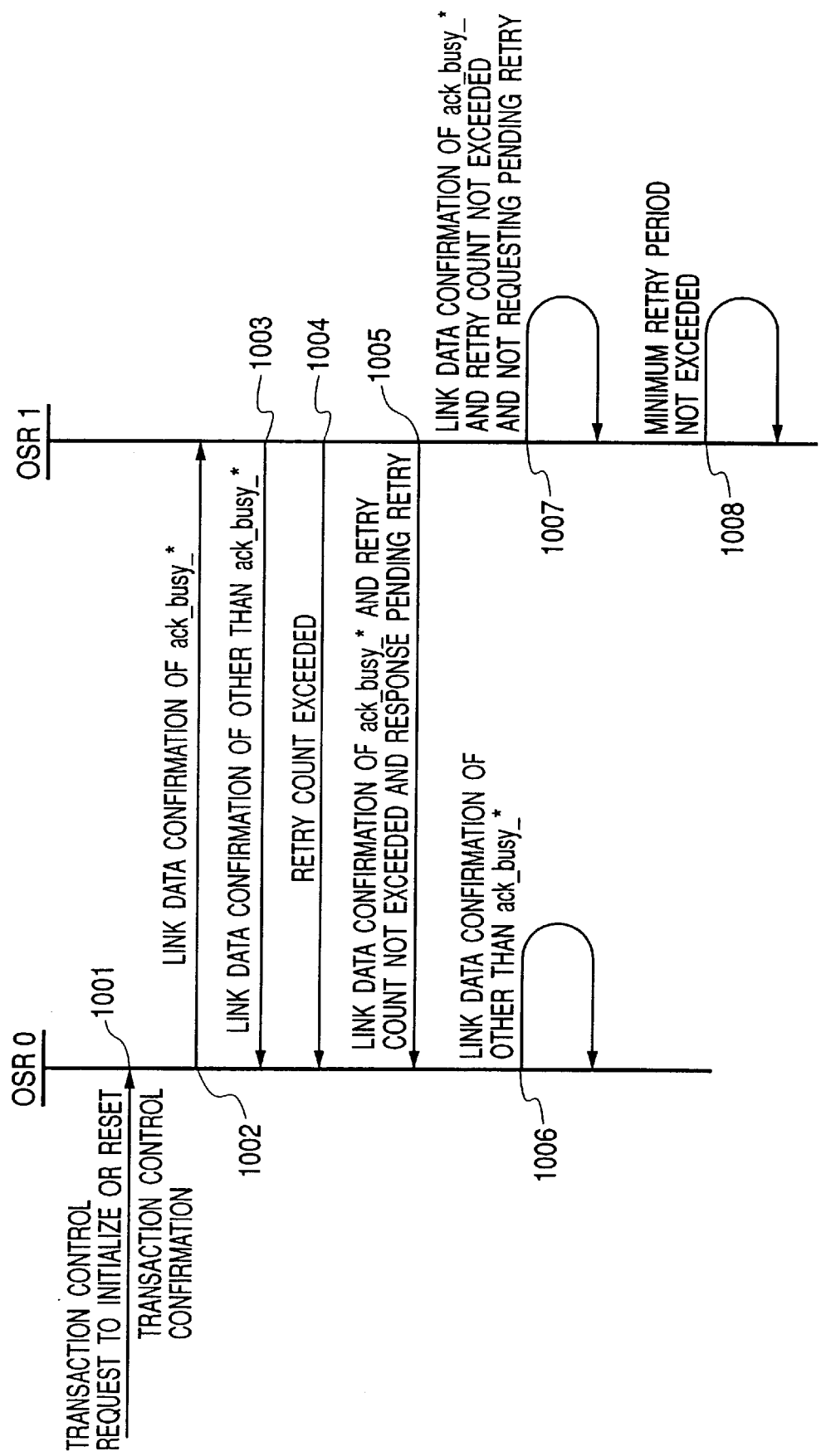
FIG. 10 is a state transition view showing an example of single-phase retry operation defined in a second embodiment.

FIG. 10 is a state transition view showing a retry procedure of the source node 302 provided with a single phase retry function defined in the embodiment.

The source node 302 transfers to OSR0 state from another state in response to a transaction control request to Initialize of Reset from its node controller (1001 of FIG. 10). In this state, the source node 302 is prepared for transmitting a predetermined packet to each destination node 304. Therefore, in the state, when a response packet indicating an acknowledge code other than ack_busy_A, ack_busy_X is received from the destination node 304, the source node 302 can transfer the next packet, and does not need to perform retrying (1006 of FIG. 10).

In the OSR0 state, when the source node 302 receives a response packet indicative of ack_busy_A, ack_busy_B or ack_busy_X, the source node 302 recognizes that the destination node 304 is busy. In this case, the source node 302 changes the state from OSR0 to OSR1, and executes retrying (1002 of FIG. 10).

In the OSR1 state, when there is a pending retry to be processed, the source node 302 processes the retry before transferring another optional packet. In this case, the source node 302 designates the retry code to retry_X to perform retrying.

In the OSR1 state, when the source node 302 does not exceed a retry limit, and the pending retry packet is not placed in a retry queue, the source node 302 again repeats retrying (1007 of FIG. 10). Here, the retry queue means a queue of retry packets.

Moreover, in the OSR1 state, a minimum retry period is set in the source node 302. The source node 302 stays in the OSR1 state without performing retrying until the minimum retry period elapses (1008 of FIG. 10).

In the OSR1 state, when the retry limit is not exceeded, and the retry packet is placed in the retry queue, the source node 302 transfers to the OSR0 state from the OSR1 state (1005 of FIG. 10).

Moreover, in the OSR1 state, when the response packet indicative of the acknowledge code other than ack_busy_A, ack_busy_B and ack_busy_X, it is judged that the retry has been processed, and the source node 302 changes to the OSR0 state from the OSR1 state (1003 of FIG. 10).

Furthermore, in the OSR1 state, when the source node 302 performs the retry of a certain packet until the retry limit is exceeded, it is judged that the retry has failed, and the source node 302 changes to the OSR0 state from the OSR1 state (1004 of FIG. 10).

Figure 11:
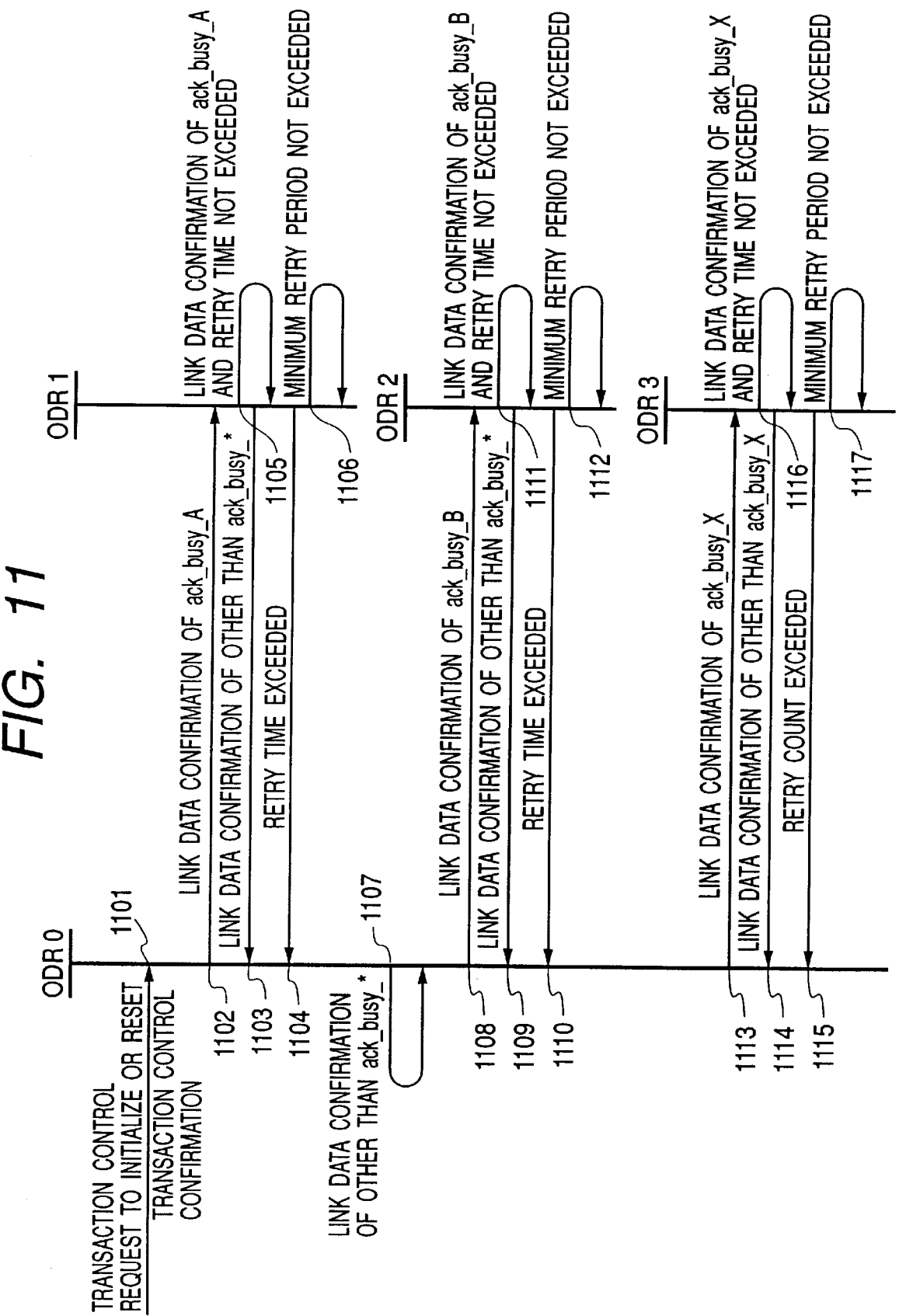
FIG. 11 is a state transition view showing an example of dual-phase retry operation defined in the second embodiment.

FIG. 11 is a state transition view showing a retry procedure of the source node 302 provided with a dual phase retry function defined in the embodiment. Additionally, the source node 302 supporting the dual phase retry function also supports the single phase retry function.

The source node 302 changes to an ODR0 state from another state in response to a transaction control request to Initialize or Reset from its node controller (1101 of FIG. 11). In this state, the source node 302 is prepared for transmitting a predetermined packet to each destination node 304. The source node 302 sets the retry code to retry_1, and is on standby.

In the ODR0 state, when the response packet other than ack_busy_A, ack_busy_B and ack_busy_X is received from each destination node 304, the source node 302 can transfer the next packet, and does not need to perform retrying (1107 of FIG. 11).

In the ODR0 state, when the response packet of ack_busy_A or ack_busy_B is received from a certain destination node 304, the source node 302 judges that the destination node 304 is a node supporting the dual phase retry function and is busy. In this case, the source node 302 performs retrying in accordance with the dual phase retry function.

When the response packet indicative of ack_busy_A is received, the source node 302 executes a retry phase A, and changes to an ODR1 state from the ODR0 state (1102 of FIG. 11). Moreover, when the response packet indicative of ack_busy_B is received, the source node 302 executes a retry phase B, and changes to an ODR2 state from the ODR0 state (1108 of FIG. 11).

Moreover, in the ODR0 state, when the response packet of ack_busy_X is received from a certain destination node 304, the source node 302 judges that the destination node 304 is a node supporting the single phase retry function and is busy. In this case, the source node 302 performs retrying in accordance with the single phase retry function. When the response packet indicative of ack_busy_X is received, the source node 302 changes to an ODR3 state from the ODR0 state (1113 of FIG. 11).

In the ODR1 state, the source node 302 is executing the retry phase A, and has a pending retry to be solved. In this state, the minimum retry period is set in the source node 302. The source node 302 stays in the ODR1 state without performing retrying until the minimum retry period elapses (1106 of FIG. 11).

In the ODR1 state, the source node 302 sets the retry code to retry_A, and performs retrying. In this case, when the response packet from the destination node 304 indicates ack_busy _A, and four fairness interval timeout periods do not elapse, the source node 302 again repeats retrying (1105 of FIG. 11). Here, the fairness interval timeout period means a period set in a period during which Asynchronous transfer is possible, which gives a fair access right to the node which is to use the network.

Moreover, in the ODR1 state, when the response retry code including the acknowledge code other than ack_busy_A and ack_busy_B is received, it is judged that the retry has been processed, and the source node 302 changes to the ODR0 state from the ODR1 state (1103 of FIG. 11).

Furthermore, in the ODR1 state, when the four fairness interval timeout periods elapse, it is judged that the retry has failed, and the source node 302 changes to the ODR0 state from the ODR1 state (1104 of FIG. 11).

In the ODR2 state, the source node 302 is executing the retry phase B, and has a pending retry to be solved. In this state, the minimum retry period is set in the source node 302. The source node 302 stays in the ODR2 state without performing retrying until the minimum retry period elapses (1112 of FIG. 11).

In the ODR2 state, the source node 302 sets the retry code to retry_B, and performs retrying. In this case, when the response packet from the destination node 304 indicates ack_busy_B, and four fairness interval timeout periods do not elapse, the source node 302 again repeats retrying (1111 of FIG. 11).

Moreover, in the ODR2 state, when the response retry code including the acknowledge code other than ack_busy_A and ack_busy_B is received, it is judged that the retry has been processed, and the source node 302 changes to the ODR0 state from the ODR2 state (1109 of FIG. 11).

Furthermore, in the ODR2 state, when the four fairness interval timeout periods elapse, it is judged that the retry has failed, and the source node 302 changes to the ODR0 state from the ODR2 state (1110 of FIG. 11).

In the ODR3 state, the source node 302 is executing the single phase retry, and has a pending retry to be solved. In this state, the minimum retry period is set in the source node 302. The source node 302 stays in the ODR3 state without performing retrying until the minimum retry period elapses (1117 of FIG. 11).

In the ODR3 state, the source node 302 sets the retry code to retry_X, and performs retrying. In this case, when the response packet from the destination node 304 indicates ack_busy_X, and the retry limit is not exceeded, the source node 302 again repeats retrying (1116 of FIG. 11).

Moreover, in the ODR3 state, when the response retry code including the acknowledge code other than ack_busy_X is received, it is judged that the retry has been processed, and the source node 302 changes to the ODR0 state from the ODR3 state (1114 of FIG. 11).

Furthermore, in the ODR3 state, when the retry count is exceeded, it is judged that the retry has failed, and the source node 302 changes to the ODR0 state from the ODR3 state (1115 of FIG. 11).

As described above, since the structure has the predetermined retry period, the source node 302 of the embodiment can assure more secure communication. Moreover, even if the bus is congested, the busy state of the destination node 304 is prevented from occurring frequently, and deadlock can be prevented.

A transfer procedure based on the communication protocol of the second embodiment will next be described with reference to FIG. 12. Additionally, the communication protocol of the second embodiment is basically processed in the same manner as the communication protocol of the first embodiment. Therefore, the procedure for performing the same processing as in FIG. 4 is denoted with the same code, and detailed description thereof is omitted. Additionally, in FIG. 12, to simplify the description, transfer between one source node 302 and one destination node 304 is shown, but the same processing can be performed even when more than one destination node 304 are provided.

The controller 300 sets the connection ID for identifying a logical connection relationship between the source node 302 and at least one destination node 304. Subsequently, the controller 300 notifies each node of the connection ID, and sets one connection (401, 402 of FIG. 12).

Figure 12:
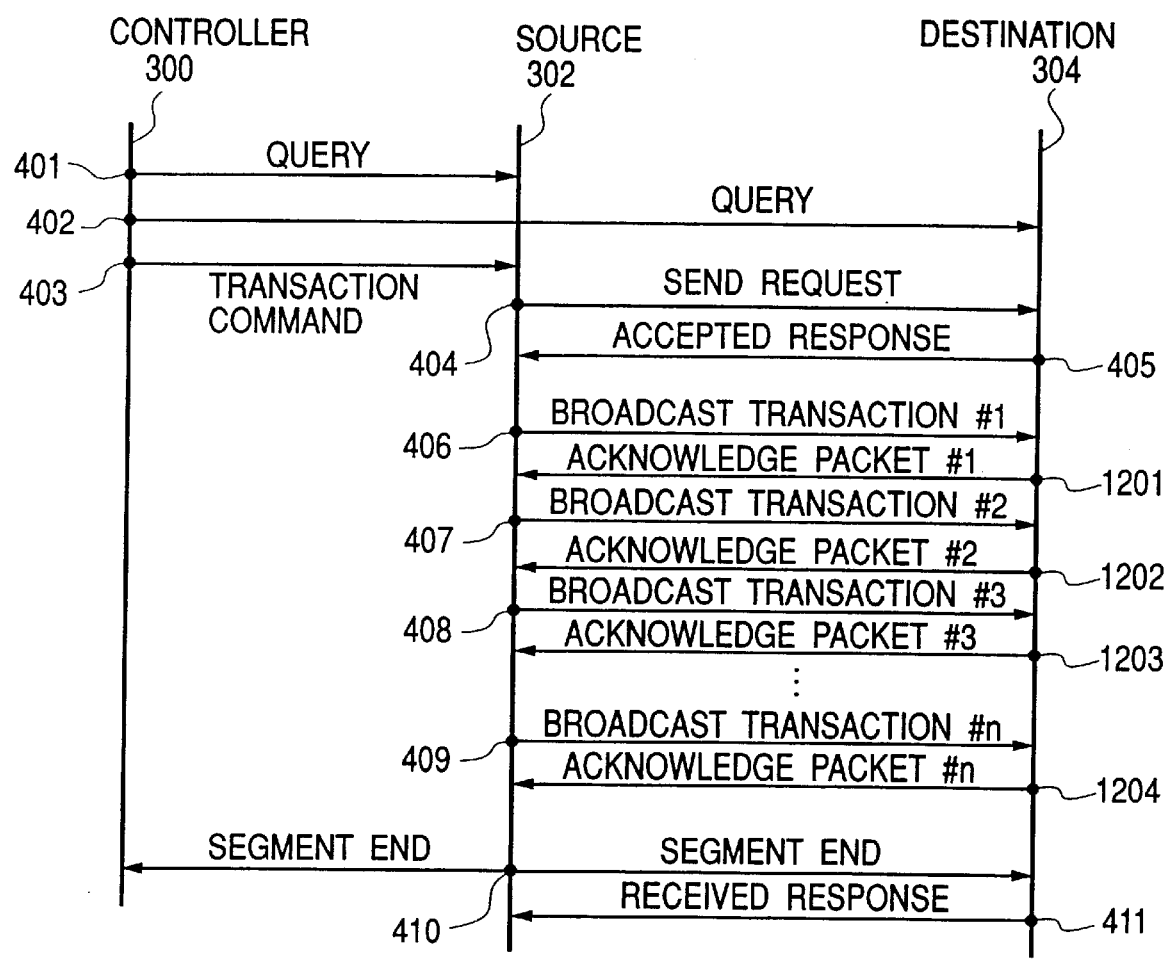
FIG. 12 is a sequence chart showing a basic communication procedure of communication protocol of the second embodiment.

After notifying the connection ID, the controller 300 commands the source node 302 to start transferring the object data 308 (403 of FIG. 12).

After receiving a transaction command, the source node 302 conducts negotiations with at least one destination node 304 to set initial Asynchronous broadcast transaction (404, 405 of FIG. 12).

After completing initialization, the source node 302 executes Asynchronous broadcast transaction to successively broadcast the object data 308 constituted of one or more segment data (406 to 409 of FIG. 12).

Here, the source node 302 transfers one or more segment data by performing Asynchronous broadcast transaction at least once in the same manner as in the first embodiment. The object data 308 is segmented, for example, in a plurality of segments as shown in FIG. 7, and one segment data is transferred by using Asynchronous broadcast transaction once.

After all the segment data are transferred, the source node 302 completes the data communication with one or more destination nodes 304 (410, 411 of FIG. 12).

The operation of the controller 300 will next be described in detail with reference to FIG. 12.

The controller 300 conducts negotiations to set a connection between the source node 302 selected by the user and at least one destination node 304. Subsequently, the controller 300 performs Asynchronous transfer of a packet for setting the connection between the nodes (hereinafter referred to as the connection setting packet) (401, 402 of FIG. 12).

Here, the controller 300 has a function of controlling a destination offset used by each connection. The controller 300 uses an offset address notified from each destination node 304 to set a destination offset for designating in common a memory space of each destination node 304. Alternatively, a destination offset corresponding to a certain connection is set in a predetermined procedure. After the setting, the destination offset is notified to the source node 302 from the controller 300.

The connection ID indicating the connection between the source node 302 and the destination node 304 is stored in a payload of the connection setting packet. Each node identifies a connection set to itself by the connection ID. Additionally, the connection ID is set by the controller 300 based on the connection ID already set to the source node 302 and the connection ID already set to each destination node 304.

Subsequently, the controller 300 performs Asynchronous transfer of a transaction command packet to the source node 302 (403 of FIG. 12).

Upon receipt of the transaction command packet, the source node 302 performs the initialization using the connection ID notified from the controller 300 to execute Asynchronous broadcast transaction (404 to 409 of FIG. 12). Through the Asynchronous broadcast transaction, the source node 302 can successively transfer the object data 308 constituted of one or more segment data.

Additionally, in the communication protocol of the embodiment, the controller 300 provides a function of controlling connection/disconnection. Therefore, after the connection is set, the object data 308 is transferred by the negotiation between the source node 302 and the destination node 304.

After a series of Asynchronous broadcast transactions are completed, the source node 302 broadcasts Asynchronous broadcast packet indicating a segment end (hereinafter referred to as the segment end packet) (410 of FIG. 12).

After receiving the segment end packet from the source node 302, the controller 300 releases the connection to complete the data transfer (411 of FIG. 12).

Here, since the segment end packet is broadcast, the content of the packet can be detected even in the destination node 304. Therefore, instead of the controller 300, the destination node 304 itself may release the connection from the source node 302.

The operation of the source node 302 will next be described in detail with reference to FIG. 12.

The source node 302 having received the connection setting packet and the transaction command packet from the controller 300 transmits Asynchronous broadcast packet (hereinafter referred to as the send request packet) to each destination node 304 requesting for data transfer (404 of FIG. 12).

Here, the send request packet means a request packet for obtaining necessary initial information before executing Asynchronous broadcast transaction of the object data 308. The connection ID designated by the controller 300 is written in the packet.

The destination node 304 broadcasts Asynchronous broadcast packet (hereinafter referred to as the accepted response packet) indicative of a response corresponding to the send request packet (405 of FIG. 12). Here, the same connection ID as that in the send request packet is stored in the accepted response packet. Therefore, the source node 302 can identify via which connection the accepted response packet is transferred, by confirming the connection ID of the received packet.

Here, the size of the internal buffer in which each destination node 304 can be secured is stored in the accepted response packet. After receiving the accepted response packet, the source node 302 sets the destination offset for designating a common memory space for the destination nodes 304, and starts Asynchronous broadcast transaction. Here, the destination offset is notified by the controller 300.

Subsequently, the source node 302 writes the first Asynchronous broadcast packet in the memory space indicated by the destination offset (406 of FIG. 12). The connection ID and the sequence number of the segment data are stored in the packet.

Figure 13:
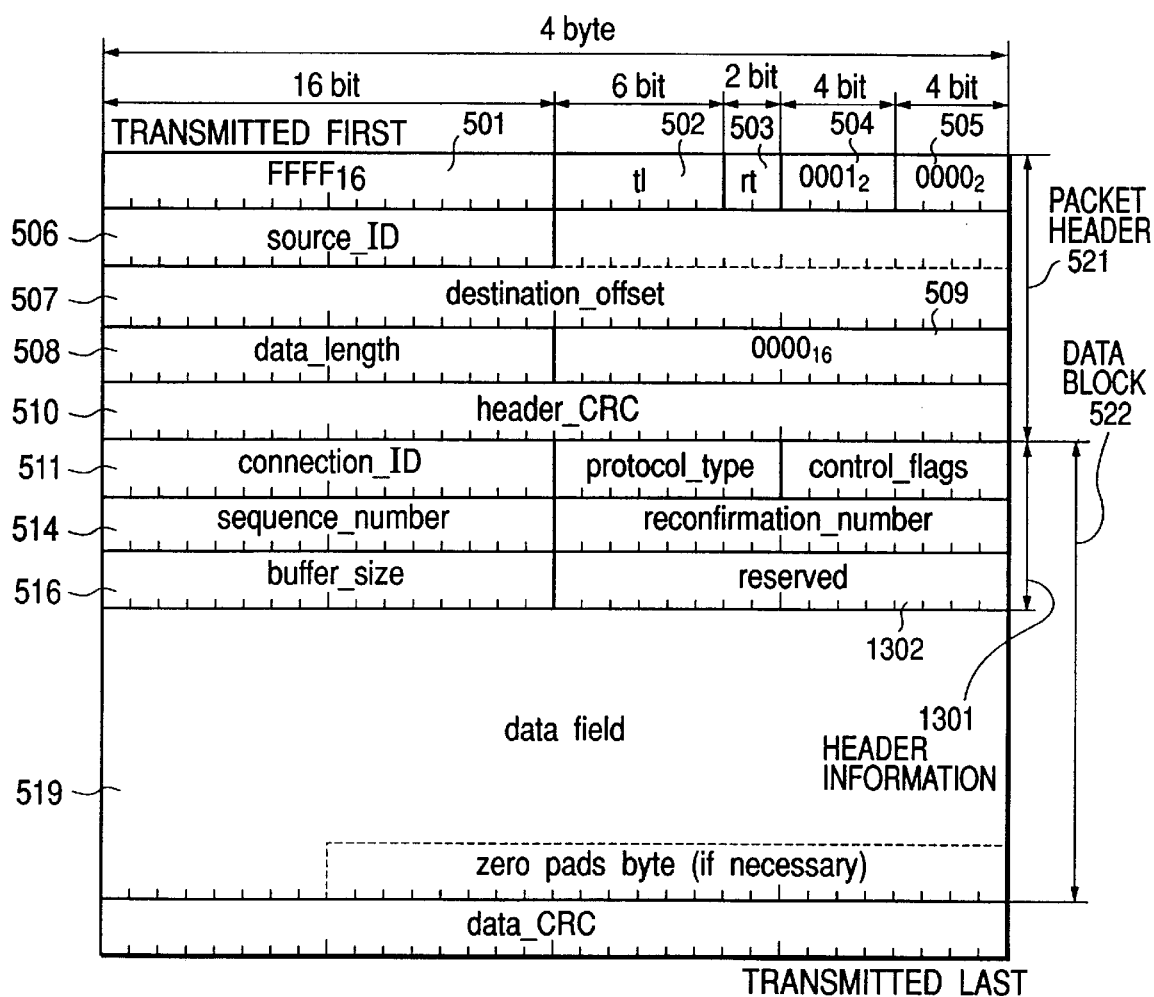
FIG. 13 is a view showing an Asynchronous broadcast packet of the second embodiment.

After transmitting the first Asynchronous broadcast packet, the source node 302 waits for an acknowledge packet from each destination node 304 (1201 of FIG. 12). The acknowledge packet transferred from each destination node 304 is constituted as shown in FIG. 13. Here, when the destination node 304 is busy, the source node 302 performs the two types of retry, so that more secure data transfer can be assured, while the deadlock can be prevented.

After receiving the acknowledge packet, the source node 302 increments the sequence number, and transfers Asynchronous broadcast packet including the next segment data (407 of FIG. 12).

The source node 302 repeats the procedure to successively perform Asynchronous broadcast transaction (408, 409 of FIG. 12). A maximum period of time during which the acknowledge packet from the destination node 304 is waited for is determined beforehand. The period of time is referred to as the response period. The response period is set in the same manner as in the first embodiment. Even after the response period elapses after Asynchronous broadcast transaction of the i-th segment data, the acknowledge packet is not returned. In this case, the source node 302 resends the same data as the segment data.

Moreover, when the response packet is transferred from the destination node 304 requesting for resend, the source node 302 can broadcast the data of the designated sequence number again.

After Asynchronous broadcast packet transaction of all the object data 308 is performed, the source node 302 broadcasts the segment end packet, and completes the data transfer (410, 411 of FIG. 12).

Here, as described above, the source node 302 segments the object data 308 into one or more segment data as required. In Asynchronous broadcast transaction of each segment data, the aforementioned response packet is generated. One segment data is transferred by performing Asynchronous broadcast transaction once. The destination node 304 has the volume of buffer which is indicated by the buffer size.

Additionally, in the embodiment, the acknowledge packet is necessarily sent out in Asynchronous broadcast transaction of one segment data, which is not limited. After the internal buffer of the destination node 304 is filled with a plurality of continuous segment data, the destination node 304 may transmit the acknowledge packet. In the structure, since the frequency of the response operation performed by the destination node 304 can be reduced, the structure of the destination node 304 can be simplified, and the processing rate can be enhanced.

The operation of the destination node 304 will next be described in detail with reference to FIG. 12.

The destination node 304 having received the connection setting packet from the controller 300 waits for the send request packet from the source node 302 (404 of FIG. 12).

The destination node 304 having received the send request packet confirms the connection ID written in the packet and the connection ID notified from the controller, and determines whether or not the packet is transferred from the source node 302.

After receiving the send request packet from the source node 302, each destination node 304 broadcasts the connection ID, and the accepted response packet in which the secured size of the internal buffer is written (405 of FIG. 12).

After the Asynchronous broadcast packet transferred from the source node 302 is written in the memory space, the destination node 304 confirms the connection ID of the packet. When the connection ID included in the packet coincides with the connection ID of the destination node 304 itself, the acknowledge packet is broadcast (406 to 409 of FIG. 12). In this case, the segment data included in the received packet is stored in the internal buffer. Here, when the connection ID included in the received packet is different from its connection ID, the destination node 304 discards the received packet.

Moreover, when the destination node 304 detects mismatching of the sequence number of the received packet, the packet may be sent out requesting for resend. In this case, the destination node 304 designates the sequence number for the resend request, and notifies the source node 302 of the number.

When all the Asynchronous broadcast transactions are completed, the segment end packet is broadcast from the source node 302. Upon receiving the packet, the destination node 304 completes the data transfer process (410 of FIG. 12).

After receiving the segment end packet, the destination node 304 broadcasts the packet indicating that the segment end packet is normally received (411 of FIG. 12).

As described above, the communication system of the embodiment can solve inconveniences of the conventional communication system. Moreover, even in the data transfer requiring no real-time properties, the data can easily be transferred at high speeds.

Furthermore, in the embodiment, after the controller 300 sets the connection, the process of transferring the object data is performed between the source node 302 and each destination node 304 without being controlled by the controller 300. Therefore, there can be provided a simple communication protocol in which the load of the controller 300 is reduced and no complicated communication procedure is necessary.

Additionally, in the embodiment, the destination node 304 is sure to send a response to each Asynchronous broadcast transaction. Therefore, there can be provided a communication protocol in which the data requiring no real-time properties can securely be transferred.

In order to realize more secure data transfer, when the data transfer is interrupted by occurrence of the bus reset or any transmission error, the data transfer needs to be instantly resumed without dropping any data. A resuming procedure defined in the communication protocol of the embodiment will be described hereinafter with reference to FIG. 4B.

For example, when the bus reset occurs after Asynchronous broadcast packet with a sequence number i is received, each node discontinues the transfer process, and executes bus initialization, recognition of connection structure, setting of node ID, and the like in accordance with the procedure defined in the IEEE 1394-1995 standards (420, 421 of FIG. 4B).

After bus reconstruction is completed, each destination node 304 broadcasts a resend request packet in which the connection ID and the sequence number i are stored (422 of FIG. 4B).

When Asynchronous broadcast transaction can be resumed, the source node 302 confirms the connection ID of the received resend request packet to broadcast the ack response packet in which the connection ID is stored (423 of FIG. 4B).

Subsequently, the source node 302 successively broadcasts the segment data of and after the sequence number requested by the received resend request packet, i.e., the sequence data starting with sequence number i+1 (424 of FIG. 4B).

In the aforementioned procedure, even if the data transfer is interrupted, the controller 300, the source node 302, and the destination node 304 can easily and securely resume the subsequent data transfer without considering each node ID.

Moreover, as described above, in the embodiment, even when the data transfer is interrupted, the control procedure of the controller 300 can effectively be simplified.

The structure of Asynchronous broadcast packet defined in the second embodiment will next be described with reference to FIG. 13. Additionally, in FIG. 13, the field having the same function as that of Asynchronous broadcast packet of the first embodiment is denoted with the same code as in FIG. 5.

First, a structure of packet header 521 will be described.

In FIG. 13, a field 501 (16 bits) indicates destination_ID, and a node ID of a destination (i.e., destination node 304) is indicated. In the communication protocol of the embodiment, in order to realize Asynchronous broadcast transaction of the object data 308, a value of the field is set as broadcasting ID (i.e., $FFFF_{16}$).

A field 502 (6 bits) indicates a transaction label (tl) field, or a tag peculiar to each transaction.

A field 503 (2 bits) indicates a retry (rt) code, and designates whether or not the packet makes a retry.

A field 504 (4 bits) indicates a transaction code (tcode), which designates a packet format or a transaction type to be executed. In the embodiment, a value of the field is set, for example, to $0001_2$ to request for a process of writing a data block 522 of the packet into the memory space indicated by a destination_offset field 507 (i.e., write transaction).

A field 505 (4 bits) indicates a priority (pri), and designates the order of priority. In the embodiment, a value of the field is set to $0000_2$.

A field 506 (16 bits) indicates source_ID, or the node ID of the transmission side (i.e., source node 302).

The field 507 (48 bits) indicates destination_offset, and designates low-order 48 bits of the address space of each destination node 304 in common. Here, for destination_offset, the same value may be set in all the connections, or different values may be set in the connections. However, when the different values are set, Asynchronous broadcast packets from a plurality of connections can efficiently be processed in parallel.

A field 508 (16 bits) indicates data_length, and a length of data field described later is indicated in units of bytes.

A field 509 (16 bits) indicates extended_tcode. In the embodiment, a value of the field is set to $0000_{16}$.

A field 510 (32 bits) indicates header_CRC, in which error detecting codes for the fields 501 to 509 are stored.

A structure of the data block 522 will next be described. In the embodiment, the data block 522 is constituted of a header information 1301 and a data field 524.

A connection ID for identifying a logical connection relationship between the nodes, and the like are stored in the header information 1301.

Moreover, the data field 524 has a variable length, in which the segment data is stored. Here, when the segment data stored in the data field 524 is not a multiple of Quadlet, a portion not satisfying Quadlet is filled with zero.

A field 511 (16 bits) indicates connection_ID, and stores the connection ID of the embodiment. The 1394 interface of the embodiment identifies the connection set between the source node 302 and at least one destination node 304 based on the connection ID stored in the field. In the embodiment, connections of $2^{16}\times$the number of nodes can be established. Therefore, a plurality of connections can be set until the total amount of communication band used by each connection reaches the volume of the transmission path.

A field 512 (8 bits) indicates protocol_type, and communication procedure based on the header information 1301 (i.e., communication protocol type) is indicated. When the communication protocol of the embodiment is indicated, a value of the field is, for example, $01_{16}$.

A field 513 (8 bits) indicates control_flags, and predetermined control data for controlling communication procedure and the like of the communication protocol of the embodiment are set. In the embodiment, a most significant bit of the field is set, for example, as a resend_request flag.

Therefore, when the most significant bit of the field has a value of 1, it is indicated that the resend request based on the communication protocol of the embodiment is generated.

A field 514 (16 bits) indicates sequence_number, and a continuous value (i.e., sequence number) is set to a packet transferred based on a specified connection ID (connection ID designated by the field 511). The destination node 304 can monitor continuity of segment data successively subjected to Asynchronous broadcast transaction by the sequence number. When an inequality occurs, the destination node 304 can request for resend based on the sequence number.

A field 515 (16 bits) indicates reconfirmation_number. In the embodiment the field has a meaning only when the resend request flag has a value of 1. For example, when the value of the resend request flag is 1, the sequence number of the packet requesting for resend is set in the field.

A field 516 (16 bits) indicates buffer_size. The internal buffer size of the destination node 304 is set in the field.

A field 1302 (16 bits) indicates reserved, and is reserved for future expanding specifications.

A field 519 (32 bits) indicates data_CRC, and error detecting codes for the fields 511 to 518 (including the header information 1301 and the data field 524) are stored in the same manner as the header_CRC.

A structure of the acknowledge packet will next be described. The destination node 304 having received the segment data by Asynchronous broadcast packet shown in FIG. 13 returns a response using the acknowledge packet shown in FIG. 14.

Figure 14:
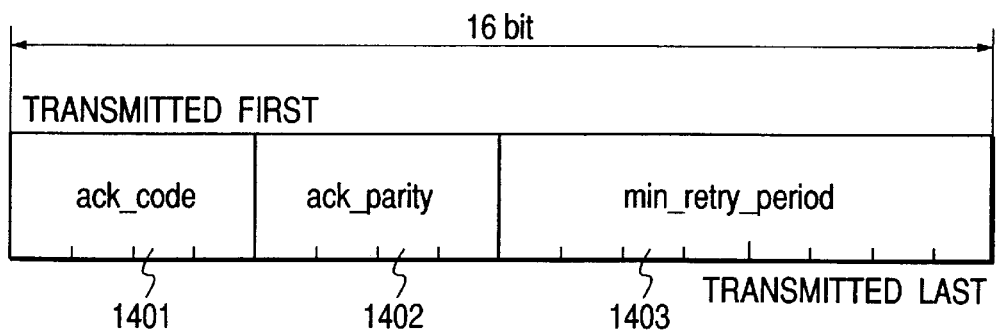
FIG. 14 is a view showing a structure of an acknowledge packet defined in the second embodiment.

In FIG. 14, a field 1401 (4 bits) is a field in which ack_code is stored. The aforementioned ack_busy_A, ack_busy_B, ack_busy_X, or another code is transferred to the source node 302 by the field.

A field 1402 (4 bits) is a field in which ack_parity is stored. A parity check code of the acknowledge packet is stored in the field. For example, in the second embodiment, a complement of a value 1 of the ack_code is stored. The field is used in error detection of the field 1401.

The next field 1403 (8 bits) is a field in which min_retry_period is stored. The value of the minimum retry period shown in FIGS. 10, 11 is stored in the field, for example, in units of one millisecond. For example, when the value of the field is $01_{16}$ the source node 302 having received the acknowledge packet sets the minimum retry period to one millisecond, and operates not to perform retrying during the period. Additionally, the time unit which can be set in the field 1403 is not limited to one millisecond, and another time unit may be used.

Here, each destination node 304 can variably set an optimum value to be stored in the field 1403 in accordance with its reception ability or load state. For example, each destination node 304 monitors its load state, sets large the value of minimum retry period when the load is large, and sets small the value when the load is small.

For the node load state, the number of retries performed on the node, the number of packets transmitted to the node, the occupied state of the node buffer, the number of connections of the node, and other various indicators can be used. Additionally, the indicator for detecting the node load state is not limited as long as the node load state can be detected.

Additionally, in the embodiment, the value to be stored in the field 1403 can be provided with a special meaning. For example, a standard (default) value is set as $00_{16}$, and the minimum retry period indicated by the value may be set to 100 milliseconds. Additionally, the minimum retry period indicated by the standard (default) value is not limited to 100 milliseconds, and another value may be set. Moreover, for example, a so-called immediately retry may be indicated, in which $00_{16}$ is set as the standard (default) value to perform retrying as soon as possible.

FIG. 15 is a diagram showing operation for setting the minimum retry period. FIG. 15A shows an operation flow in which the packet is transmitted/received between the source node 302 performing Asynchronous broadcast transaction and the destination node 304 returning the acknowledge packet shown in FIG. 14 to the transaction. Moreover, FIG. 15B is a graph showing changes of the load state of the destination node 304 with time. In FIG. 15B, the load state of the destination node 304 is shown in a horizontal direction, while the elapse of time is indicated in a vertical direction.

In FIG. 15 at a time $t_1$ when the source node 302 performs a first Asynchronous broadcast transaction (write request #1), the load of the destination node 304 is relatively small $L_1$, and busy (1501 of FIG. 15). In this case, for example, the destination node 304 sets the value of the min_retry_period to $32_{16}$, and returns the acknowledge packet of ack_busy_X (1502 of FIG. 15).

The source node 302 sets the minimum retry period to 50 milliseconds from the value of the min_retry_period of the acknowledge packet (1503 of FIG. 15). The source node 302 performs no retry during the minimum retry period, and performs retrying at least 50 milliseconds later (1504 of FIG. 15, retry #1). In FIG. 15, the retry is successful, and the write transaction is completed (1505 of FIG. 15).

Subsequently, at a time $t_2$ when the source node 302 performs a second Asynchronous broadcast transaction (write request #2), the load of the destination node 304 is relatively large $L_2$, and busy (1506 of FIG. 15). For example, the destination node 304 sets the value of the min_retry_period to $B4_{16}$, and returns the acknowledge packet of ack_busy_X (1506 of FIG. 15).

The source node 302 sets the minimum retry period to 180 milliseconds from the value of the min_retry_period of the acknowledge packet (1507 of FIG. 15). The source node 302 performs no retry during the minimum retry period, and performs retrying at least 180 milliseconds later (1508 of FIG. 15, retry #2).

In the aforementioned operation, in the embodiment, since the destination node to send the acknowledge packet dynamically sets the minimum retry period, there can be provided a communication system and a communication protocol, in which more secure data communication is assured. Additionally, even if the bus is congested, the busy state is prevented from occurring frequently, and the deadlock can be prevented from occurring. Moreover, in the aforementioned operation, in the embodiment, since the minimum retry period can dynamically be set, communication resource can appropriately be distributed, and communication efficiency can be enhanced while the communication path is not occupied with the source node to perform retrying.

Moreover, in the aforementioned operation, even when transfer is executed between the source node fast in transmission speed and the destination node slow in reception speed, the source node can be prevented from frequently performing retrying, and the receiving buffer of the destination node can constantly be prevented from becoming full.

Additionally, in FIG. 15, to simplify the description, transfer between one source node 302 and one destination node 304 is shown, but the same processing can be performed even when more than one destination node 304 are provided. In this case, the source node 302 determines an optimum minimum retry period based on the acknowledge packet transferred from each destination node 304.

As described above, in the embodiments, the logical connection relationship independent of the physical connection mode can be constructed in the bus type network like the IEEE 1394-1995 standards.

Moreover, according to the embodiment, in the communication system conforming to the IEEE 1394-1995 standards, there can be provided a completely novel communication protocol in which a relatively large amount of object data (e.g., still image data, graphic data, text data, file data, program data, and the like) requiring no real-time properties but requiring reliability are segmented into one or more segment data, and continuously transferred.

Furthermore, according to the embodiment, in the communication system conforming to the IEEE 1394-1995 standards, there can be provided a completely novel communication protocol which realizes data communication between a plurality of apparatuses using a communication system to broadcast data asynchronously.

Additionally, in the embodiment, a plurality of continuous data can securely be transferred without using Isochronous transfer system of the IEEE 1394-1995 standards. Moreover, one object data is segmented into a plurality of data, and can securely be transferred.

Moreover, in the embodiment, since the communication among the plurality of apparatuses is controlled with one connection, a plurality of communications can simultaneously be performed without using much communication band.

Furthermore, in the embodiment, when the data transfer is interrupted by the bus reset or transmission error, it can be known which segment data is lost, and transfer can be resumed without following a very intricate communication procedure.

Other Embodiments

The communication protocol and various necessary processing operations for realizing the communication protocol described in the above embodiments can be realized by software.

For example, a storage medium in which a program code for realizing the aforementioned embodiment function is stored is supplied to apparatus controllers constituting the communication system of the embodiment (e.g., MPU 12, system controller 50, printer controller 68 of FIG. 2). Subsequently, the controller reads the program code stored in the storage medium, and controls the communication system or the apparatus operation to realize the embodiment function in accordance with the program code. The aforementioned embodiment can thus be realized.

Moreover, the storage medium in which the program code for realizing the aforementioned embodiment function is stored is supplied to the 1394 interfaces 14, 44, 62 mounted on each apparatus, and the controller (e.g., serial bus management 806 of FIG. 8) for controlling the operation of the 1394 interfaces 14, 44, 62 controls the processing operation to realize the embodiment function in accordance with the program code stored in the storage medium.

In this case, the program code read from the storage medium realizes the embodiment function, and the program code and the means for supplying the program code to the controller (e.g., the storage medium itself) constitute the present invention.

For the storage medium in which the program code is stored, for example, floppy disc, hard disc, optical disc, magnetic optical disc, CD-ROM, magnetic tape, non-volatile memory card, ROM, and the like can be used.

Moreover, it goes without saying that the present invention also includes a case where the program code read from the storage medium realizes the embodiment functions in cooperation with OS (operating system) operated on the controllers, various application software, and the like.

The present invention further includes a case where after the program code read from the storage medium is stored in the memory mounted on the function expansion unit connected to the controller, the controller provided on the function expansion unit performs a part or whole of the actual processing in accordance with the program code stored in the memory to realize the embodiment functions.

The invention may be embodied in other specific forms without departing from the spirit or essential characteristics thereof.

For example, the communication protocol of the first embodiment can be combined with that of the second embodiment. Therefore, the optimum time interval between the i-th and (i+1)-th Asynchronous broadcast transactions can be determined. Additionally, even if the i-th Asynchronous broadcast transaction is not normally received, retry can be inhibited for the predetermined time.

Moreover, in the embodiments, the communication protocol applicable to the network conforming to the IEEE 1394-1995 standards has been described, but the invention is not limited thereto. The communication protocol of the embodiment can be applied to a bus-type network like in the IEEE 1394-1995 standards or a network which can virtually constitute the bus-type network.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A data communication system comprising:
   a source node adapted to transmit packets asynchronously; and
   a destination node adapted to receive the packets transmitted from the source node,
   wherein the source node is adapted to receive reception capability information including a reception capability of the destination node, to determine, in accordance with the reception capability information, a waiting time that is a time for waiting for a response packet corresponding to a packet transmitted from the source node, and to transmit a next packet if the source node receives the response packet in the waiting time.

2. A method to be used in a data communication system comprising a source node adapted to transmit packets asynchronously, and a destination node adapted to receive the packets transmitted from the source node, the method comprising steps of:
   receiving reception capability information including a reception capability of the destination node;
   determining, in accordance with the reception capability information, a waiting time that is a time for waiting for a response packet corresponding to a packet transmitted from the source node; and
   transmitting a next packet if the source node receives the response packet in the waiting time.

3. A data communication apparatus adapted to transmit packets asynchronously, the apparatus comprising:
   means for receiving reception capability information including a reception capability of the destination node;
   means for determining, in accordance with the reception capability information, a waiting time that is a time for waiting for a response packet corresponding to a packet transmitted from the source node; and
   means for transmitting a next packet if the apparatus receives the response packet in the waiting time.

4. A method to be used in a data communication apparatus adapted to transmit packets asynchronously, the method comprising steps of:
   receiving reception capability information including a reception capability of the destination node;
   determining, in accordance with the reception capability information, a waiting time that is a time for waiting for a response packet corresponding to a packet transmitted from the source node; and
   transmitting a next packet if the apparatus receives the response packet in the waiting time.

5. The data communication system according to claim 1, wherein the source node is adapted to determine the waiting time before the source node transmits a first packet.

6. The data communication system according to claim 1, wherein the source node is adapted to retry transmission of the packet if the source node does not receive the response packet in the waiting time.

7. The data communication system according to claim 1, wherein the source node communicates with the destination node using a communication unit conforming to an IEEE 1394-1995 standard.

8. The method according to claim 2, wherein the determining step determines the waiting time before the source node transmits a first packet.

9. The method according to claim 2, further comprising a step of retrying transmission of the packet if the source node does not receive the response packet in the waiting time.

10. The method according to claim 2, wherein the source node communicates with the destination node using a communication unit conforming to an IEEE 1394-1995 standard.

11. The data communication apparatus according to claim 3, wherein the means for determining determines the waiting time before the source node transmits a first packet.

12. The data communication apparatus according to claim 3, further comprising means for retrying transmission of the packet if the source node does not receive the response packet in the waiting time.

13. The data communication apparatus according to claim 3, wherein the data communication apparatus communicates with the destination node using a communication unit conforming to an IEEE 1394-1995 standard.

14. The method according to claim 4, wherein the determining step determines the waiting time before the source node transmits a first packet.

15. The method according to claim 4, further comprising a step of retrying transmission of the packet if the source node does not receive the response packet in the waiting time.

16. The method according to claim 4, wherein the data communication apparatus communicates with the destination node using a communication unit conforming to an IEEE 1394-1995 standard.

* * * * *